US 11,611,142 B2

United States Patent
Kim et al.

(10) Patent No.: US 11,611,142 B2
(45) Date of Patent: *Mar. 21, 2023

(54) ELECTRONIC DEVICE INCLUDING AN ANTENNA STRUCTURE

(71) Applicant: Samsung Electronics Co., Ltd., Suwon-si (KR)

(72) Inventors: Kyungbin Kim, Suwon-si (KR); Chongo Yoon, Suwon-si (KR); Sumin Yun, Suwon-si (KR); Hyunseock Roh, Suwon-si (KR); Gyubok Park, Suwon-si (KR); Jinwoo Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,022

(22) Filed: May 21, 2021

(65) Prior Publication Data
US 2021/0280962 A1     Sep. 9, 2021

Related U.S. Application Data

(63) Continuation of application No. 17/082,520, filed on Oct. 28, 2020, now Pat. No. 11,018,415.

(30) Foreign Application Priority Data

Oct. 28, 2019   (KR) .................. 10-2019-0134682

(51) Int. Cl.
*H01Q 1/24*        (2006.01)
*H04M 1/02*        (2006.01)

(52) U.S. Cl.
CPC .......... *H01Q 1/243* (2013.01); *H04M 1/0266* (2013.01); *H04M 1/0277* (2013.01)

(58) Field of Classification Search
CPC ....... H01Q 1/243; H01Q 1/42; H04M 1/0266; H04M 1/0277
See application file for complete search history.

(56) References Cited

U.S. PATENT DOCUMENTS

| 8,185,166 B2 | 5/2012 | Weber et al. |
| 8,325,094 B2 | 12/2012 | Ayala Vazquez et al. |

(Continued)

FOREIGN PATENT DOCUMENTS

| CN | 103095874 A | 5/2013 |
| CN | 104253884 A | 12/2014 |

(Continued)

OTHER PUBLICATIONS

Chinese Notice of Allowance dated May 16, 2022, issued in Chinese Application No. 202011171686.2.

(Continued)

*Primary Examiner* — Nguyen T Vo
(74) *Attorney, Agent, or Firm* — Jefferson IP Law, LLP

(57) ABSTRACT

An electronic device is provided. The electronic device includes a housing structure that includes a ceramic portion including a ceramic material, and a polymer portion formed on an inner surface of the ceramic portion and including a polymer material, and an antenna structure that is disposed within the housing structure and radiates a radio frequency (RF) signal to an outside of the housing structure. The housing structure includes a first portion including at least a portion of a region through which the RF signal passes, and a second portion formed around the first portion. In the first portion, a ratio of a thickness of the polymer portion to an entire thickness of the first portion is a first ratio. In the second portion, a ratio of a thickness of the polymer portion to an entire thickness of the second portion is a second ratio.

14 Claims, 18 Drawing Sheets

(56) References Cited

U.S. PATENT DOCUMENTS

| | | |
|---|---|---|
| 8,432,322 B2 | 4/2013 | Amm et al. |
| 8,738,099 B2 | 5/2014 | Weber et al. |
| 8,947,305 B2 | 2/2015 | Amm et al. |
| 9,008,737 B2 | 4/2015 | Na et al. |
| 9,093,745 B2 | 7/2015 | Yarga et al. |
| 9,093,752 B2 | 7/2015 | Yarga et al. |
| 9,109,093 B2 | 8/2015 | Pilliod et al. |
| 9,209,513 B2 | 12/2015 | Ely et al. |
| 9,232,659 B2 | 1/2016 | Chiang et al. |
| 9,300,036 B2 | 3/2016 | Misra et al. |
| 9,627,749 B2 | 4/2017 | Misra et al. |
| 10,312,973 B1 | 6/2019 | Luo |
| 11,018,415 B2* | 5/2021 | Kim .................... H04M 1/0266 |
| 2010/0321253 A1 | 12/2010 | Ayala Vazquez et al. |
| 2011/0012793 A1 | 1/2011 | Amm et al. |
| 2012/0076573 A1 | 3/2012 | Pilliod et al. |
| 2012/0206870 A1 | 8/2012 | Weber et al. |
| 2013/0241780 A1 | 9/2013 | Amm et al. |
| 2013/0300618 A1 | 11/2013 | Yarga et al. |
| 2014/0225489 A1 | 8/2014 | Weber et al. |
| 2014/0253392 A1 | 9/2014 | Yarga et al. |
| 2014/0361934 A1 | 12/2014 | Ely et al. |
| 2014/0361945 A1 | 12/2014 | Misra et al. |
| 2015/0003028 A1 | 1/2015 | Chiang et al. |
| 2015/0007925 A1* | 1/2015 | Aurongzeb ........... B32B 15/046 164/79 |
| 2016/0149298 A1 | 5/2016 | Ely et al. |
| 2016/0204502 A1 | 7/2016 | Misra et al. |
| 2017/0222301 A1 | 8/2017 | Shiu et al. |
| 2018/0090826 A1* | 3/2018 | Da Costa Bras Lima ................... H01Q 9/04 |
| 2018/0198196 A1 | 7/2018 | Ely et al. |
| 2018/0213660 A1 | 7/2018 | Prest et al. |
| 2018/0247582 A1* | 8/2018 | Park ...................... G06F 1/1626 |
| 2019/0199137 A1 | 6/2019 | Jiang et al. |
| 2019/0252766 A1 | 8/2019 | Jeon et al. |
| 2020/0153092 A1 | 5/2020 | Ely et al. |
| 2020/0381807 A1 | 12/2020 | Park |

FOREIGN PATENT DOCUMENTS

| | | |
|---|---|---|
| CN | 104468885 A | 3/2015 |
| CN | 205219901 U | 5/2016 |
| CN | 105960116 A | 9/2016 |
| CN | 107742779 A | 2/2018 |
| CN | 209089022 U | 7/2019 |
| CN | 110323383 A | 10/2019 |
| CN | 110324467 A | 10/2019 |

OTHER PUBLICATIONS

Chinese Office Action dated Oct. 28, 2021, issued in Chinese Application No. 202011171686.2.

* cited by examiner

| CLASSIFICATIONS | | 28GHz | 39GHz | 60GHz |
|---|---|---|---|---|
| ⓐ | THICKNESS OF CERAMIC PORTION | ≤0.4 | ≤0.3 | ≤0.2 |
| ⓑ | THICKNESS OF POLYMER PORTION | ≤0.5 | ≤0.5 | ≤0.5 |
| ⓒ | Air Gap | ≥0.4 | ≥0.4 | ≥0.4 |

ELECTRONIC DEVICE INCLUDING AN ANTENNA STRUCTURE

CROSS-REFERENCE TO RELATED APPLICATION(S)

This application is a continuation application of prior application Ser. No. 17/082,520, filed on Oct. 28, 2020, which has issued as U.S. Pat. No. 11,018,415 on May 25, 2021 and is based on and claims priority under 35 U.S.C. § 119(a) of a Korean patent application number 10-2019-0134682, filed on Oct. 28, 2019, in the Korean Intellectual Property Office, the disclosure of which is incorporated by reference herein in its entirety.

BACKGROUND

1. Field

The disclosure relates to an electronic device including an antenna structure.

2. Description of Related Art

A housing of an electronic device may be formed of various materials. The housing of the electronic device may include a nonmetal material. For example, the housing may include a ceramic material. The ceramic material may be weak from an external impact compared to the metal material. Accordingly, the housing including the ceramic material may be formed to be thicker than a housing including a metal material.

The electronic device may include an antenna structure configured to radiate a radio frequency (RF) signal. For example, the RF signal may have a wavelength of a millimeter (mm) band (e.g., 5th generation (5G)). The RF signal may pass through the housing including the nonmetal material. Here, the nonmetal material may have a given dielectric coefficient. The dielectric coefficient may vary depending on a thickness of the nonmetal material.

The above information is presented as background information only to assist with an understanding of the disclosure. No determination has been made, and no assertion is made, as to whether any of the above might be applicable as prior art with regard to the disclosure.

SUMMARY

Because a housing including a nonmetal material functions as a dielectric, the nonmetal material may influence a characteristic of a radio frequency (RF) signal radiated from an antenna structure. For example, a thickness of a nonmetal portion may be associated with the characteristic of the RF signal. Accordingly, a thickness of the housing including the nonmetal material may be determined based on the characteristic of the RF signal. In this case, the thickness of the nonmetal portion may fail to provide a sufficient mechanical rigidity to the housing.

Aspects of the disclosure are to address at least the above-mentioned problems and/or disadvantages and to provide at least the advantages described below. Accordingly, an aspect of the disclosure is to provide a housing including a nonmetal material capable of providing a specified wireless communication performance in a specified frequency band and a mechanical rigidity and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing structure that includes a ceramic portion including a ceramic material, and a polymer portion formed on an inner surface of the ceramic portion and including a polymer material, and an antenna structure that is disposed within the housing structure and radiates an RF signal to an outside of the housing structure. The housing structure may include a first portion including at least a portion of a region through which the RF signal passes, and a second portion formed around the first portion. In the first portion, a ratio of a thickness of the polymer portion to an entire thickness of the first portion may be a first ratio. In the second portion, a ratio of a thickness of the polymer portion to an entire thickness of the second portion may be a second ratio.

In accordance with another aspect of the disclosure, an electronic device is provided. The electronic device includes a housing structure that includes a front plate, a back plate facing away from the front plate, and a bracket including a frame structure surrounding a space between the front plate and the back plate and a plate structure extended from the frame structure to an inner space between the front plate and the back plate, the back plate including a ceramic portion and a polymer portion, a display that is interposed between the front plate and the plate structure and is viewable through the front plate, and an antenna structure that is interposed between the back plate and the plate structure and forms a beam, the back plate may include a first portion facing the antenna structure, and the ceramic portion may be formed to have a first thickness at the first portion and may be formed to have a second thickness greater than the first thickness at a remaining portion of the back plate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
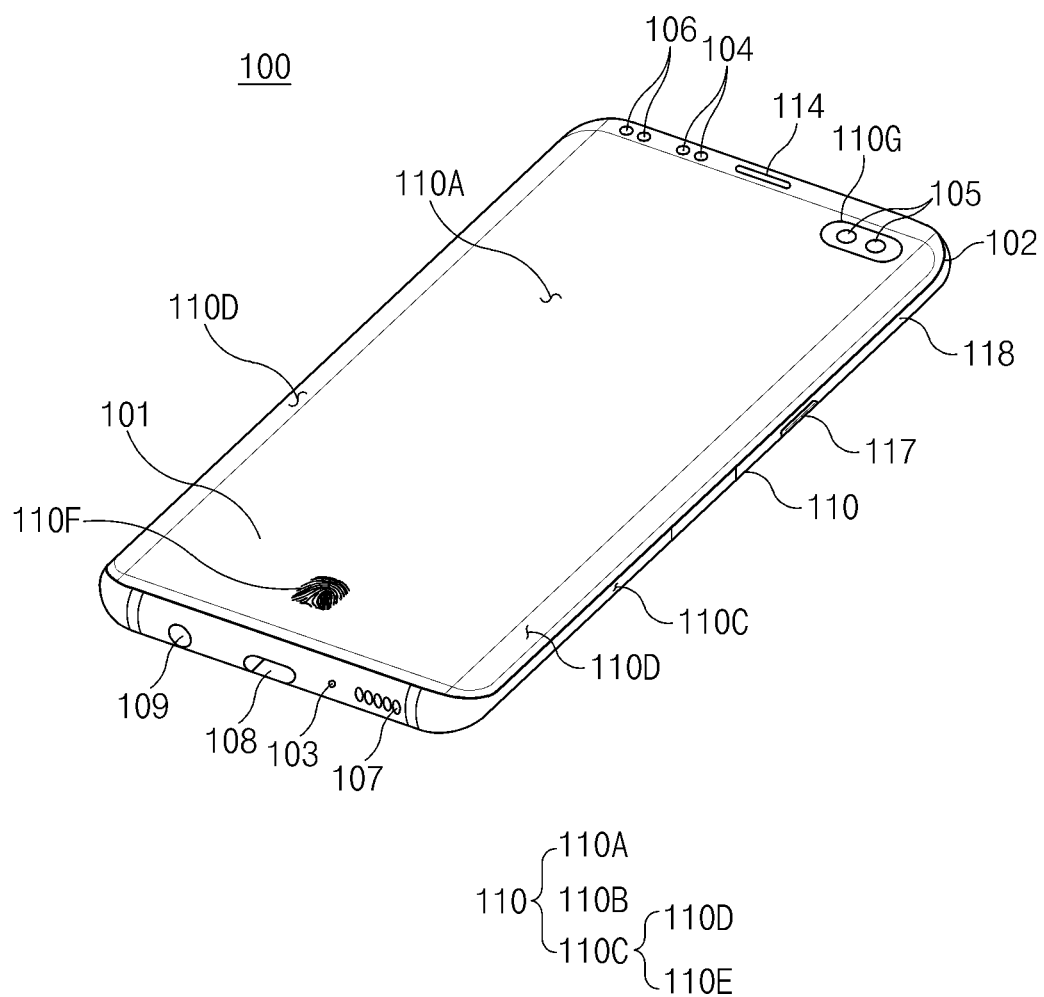
FIG. 1 is a front perspective view of an electronic device according to an embodiment of the disclosure.

FIG. 1 is a front perspective view of an electronic device according to an embodiment of the disclosure.

Figure 2:
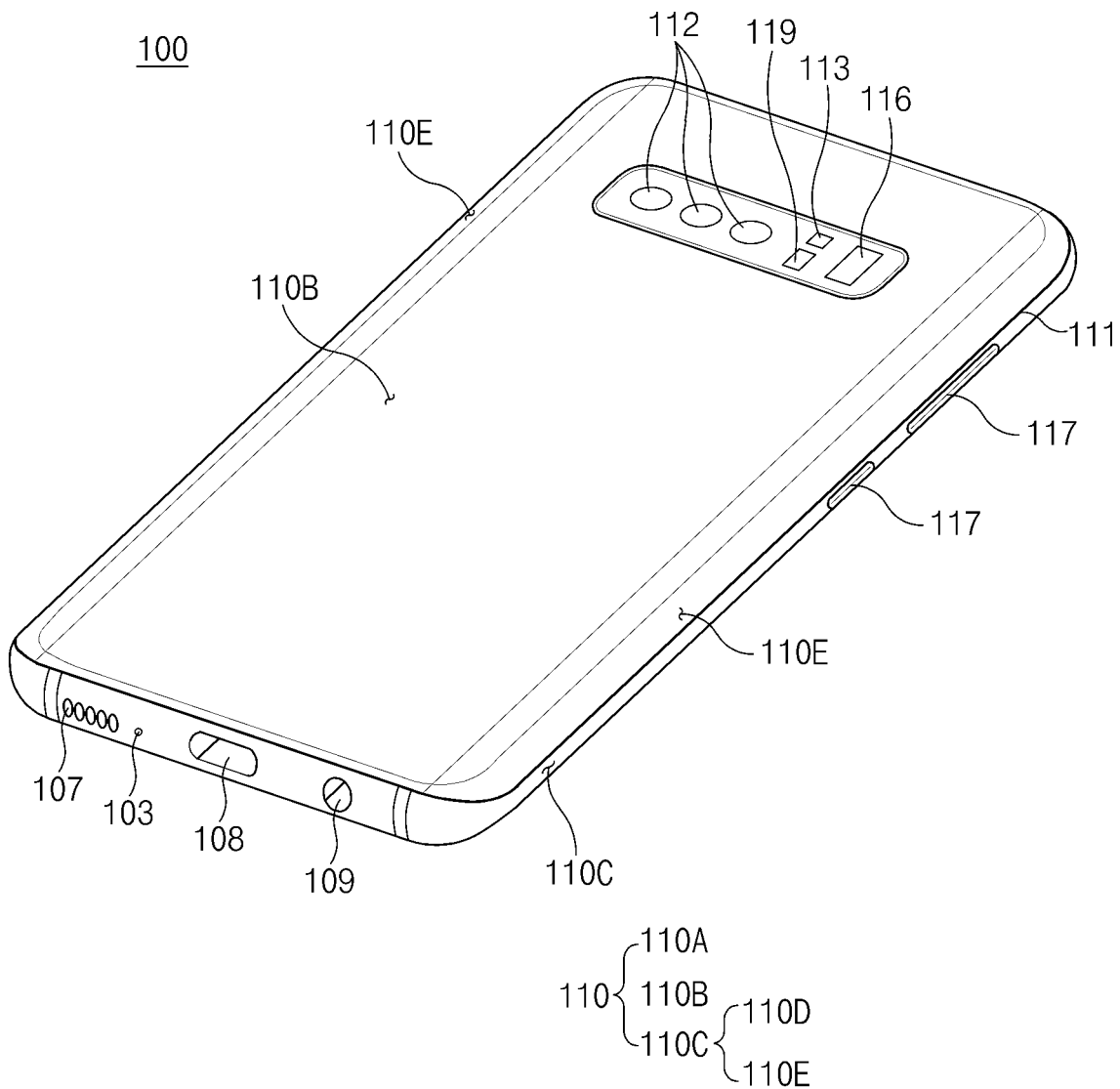
FIG. 2 is a back perspective view of an electronic device according to an embodiment of the disclosure.

FIG. 2 is a back perspective view of an electronic device according to an embodiment of the disclosure.

Referring to FIGS. 1 and 2, an electronic device 100 according to an embodiment may include a housing 110 including a first surface (or a front surface) 110A, a second surface (or a back surface) 110B, and a side surface 110C surrounding a space between the first surface 110A and the second surface 110B.

In another embodiment (not illustrated), the housing 110 may be referred to as a "structure" that forms a portion of the first surface 110A, the second surface 110B, and the side surface 110C of FIG. 1.

According to an embodiment of the disclosure, the first surface 110A may be implemented with a front plate 102 (e.g., a glass plate including various coating layers, or a polymer plate), at least a portion of which is substantially transparent. The second surface 110B may be implemented with a back plate 111 that is substantially opaque. For example, the back plate 111 may be formed of a coated or colored glass, a ceramic, a polymer, a metal (e.g., aluminum, stainless steel (STS), or magnesium), or a combination of at least two of the materials. The side surface 110C may be coupled to the front plate 102 and the back plate 111 and may be implemented with a side bezel structure (or a "side member") 118 including metal and/or polymer.

In any embodiment of the disclosure, the back plate 111 and the side bezel structure 118 may be integrally formed and may include the same material (e.g., a metal material, such as aluminum).

In the embodiment that is illustrated, the front plate 102 may include two first regions 110D, which are curved toward the back plate 111 from the first surface 110A so as to be seamlessly extended, at opposite long edges of the front plate 102.

In the embodiment (refer to FIG. 2) that is illustrated, the back plate 111 may include two second regions 110E, which are curved toward the front plate 102 from the second surface 110B so as to be seamlessly extended, at opposite long edges of the back plate 111.

In an embodiment of the disclosure, the front plate 102 (or the back plate 111) may include only one of the first regions 110D (or the second regions 110E). In another embodiment of the disclosure, the front plate 102 (or the back plate 111) may not include a part of the first regions 110D (or the second regions 110E).

In the embodiments of the disclosure, when viewed from one side of the electronic device 100, the side bezel structure 118 may have a first thickness (or width) on one side (e.g., a short side) where the first regions 110D or the second regions 110E are not included, and may have a second thickness smaller than the first thickness on one side (e.g., a long side) where the first regions 110D or the second regions 110E are included.

According to an embodiment of the disclosure, the electronic device 100 may include at least one or more of a display 101, an audio module (103, 107, 114), a sensor module (104, 116, 119), a camera module (105, 112, 113), key input devices 117, a light-emitting device 106, and a connector hole (108, 109). In an embodiment of the disclosure, the electronic device 100 may not include at least one (e.g., the key input devices 117 or the light-emitting device 106) of the components or may further include any other component.

The display 101 may be exposed, for example, through a considerable portion of the front plate 102. In an embodiment of the disclosure, at least a portion of the display 101 may be exposed through the front plate 102.

In an embodiment of the disclosure, a corner of the display 101 may be formed to be mostly identical in shape to an outer portion of the front plate 102, which is adjacent thereto. In another embodiment (not illustrated), to increase the area where the display 101 is exposed, an interval between an edge of the display 101 and an edge of the front plate 102 may be formed mostly identically.

In an embodiment of the disclosure, a surface of the housing 110 (or the front plate 102) may include a screen display region that is formed as the display 101 is visually exposed. For example, the screen display region may include the first surface 110A, and the first regions 110D of the side surface 110C.

In an embodiment of the disclosure, the screen display region (110A, 110D) may include a sensing region 110F configured to obtain biometric information of a user. Here, the expression "the screen display region (110A, 110D) includes the sensing region 110F" may be understood as at least a portion of the sensing region 110F overlaps the screen display region (110A, 110D). For example, the sensing region 110F may display visual information through the display 101 like the remaining portion of the screen display region (110A, 110D), and in addition, may mean a region capable of obtaining biometric information (e.g., a fingerprint) of the user.

In an embodiment of the disclosure, the screen display region (110A, 110D) of the display 101 may include a region 110G where the first camera device 105 (e.g., a punch hole camera) is capable of being visually exposed. For example, at least a portion of a periphery of the region 110G where the first camera device 105 is exposed may be surrounded by the screen display region (110A, 110D). In various embodiments of the disclosure, the first camera device 105 may include a plurality of camera devices.

In another embodiment (not illustrated), a recess or an opening may be formed at a portion of the screen display region (110A, 110D) of the display 101, and at least one or more of the audio module 114, the first sensor module 104, and the light-emitting device 106 may be provided to be aligned with the recess or the opening.

In another embodiment (not illustrated), the display 101 may include at least one or more of the audio module 114, the sensor module (104, 116, 119), and the light-emitting device 106 below the screen display region (110A, 110D).

In another embodiment (not illustrated), the display 101 may be combined with a touch sensing circuit, a pressure sensor capable of measuring the intensity (or pressure) of a touch, and/or a digitizer capable of detecting a magnetic stylus pen or may be disposed adjacent thereto.

In an embodiment of the disclosure, at least a part of the sensor module (104, 116, 119) and/or at least a part of the key input devices 117 may be disposed on the side surface 110C (e.g., in the first regions 110D and/or the second regions 110E).

The audio module (103, 107, 114) may include the microphone hole 103 and the speaker hole (107, 114). A microphone for obtaining external sound may be disposed within the microphone hole 103, in an embodiment of the disclosure, a plurality of microphones may be disposed to detect a direction of sound. The speaker hole (107, 114) may include the external speaker hole 107 and the receiver hole 114 for call. In an embodiment of the disclosure, the speaker hole (107, 114) and the microphone hole 103 may be implemented with one hole, or a speaker (e.g., a piezoelectric speaker) may be included without the speaker hole (107, 114).

The sensor module (104, 116, 119) may generate an electrical signal or a data value that corresponds to an internal operation state of the electronic device 100 or corresponds to an external environment state. For example, the sensor module (104, 116, 119) may include, for example, the first sensor module 104 (e.g., a proximity sensor) disposed on the first surface 110A of the housing 110, the second sensor module 116 (e.g., a time-of-flight (ToF) camera device) disposed on the second surface 110B of the housing 110, the third sensor module 119 (e.g., a hear rate monitor (HRM) sensor) disposed on the second surface 110B of the housing 110, and/or a fourth sensor module (e.g., a sensor 138 of FIG. 3) (e.g., a fingerprint sensor) coupled to the display 101.

In various embodiments of the disclosure, the second sensor module 116 may include a ToF camera device for measuring a distance.

In various embodiments of the disclosure, at least a portion of the fourth sensor module (e.g., the sensor 138 of FIG. 3) may be disposed below the screen display region (110A, 110D). For example, the fourth sensor module may be disposed in the recess (e.g., a recess 139 of FIG. 3) formed on a back surface of the display 101. For example, the fourth sensor module (e.g., the sensor 138 of FIG. 3) may not be exposed through the screen display region (110A, 110D) and may form the sensing region 110F at at least a portion of the screen display region (110A, 110D).

In an embodiment (not illustrated), the fingerprint sensor may be disposed on the second surface 110B as well as the first surface 110A (e.g., the screen display region (110A, 110D)) of the housing 110.

In various embodiments of the disclosure, the electronic device 100 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illumination sensor.

The camera module (105, 112, 113) may include the first camera device 105 (e.g., a punch hole camera device) exposed through the first surface 110A of the electronic device 100, and the second camera device 112 and/or the flash 113 exposed through the second surface 110B.

In an embodiment of the disclosure, the first camera device 105 may be exposed through a portion of the screen display region of the first surface 110A. For example, the first camera device 105 may be exposed through an opening (not illustrated) that is formed at a portion of the display 101 and corresponds to a partial region of the screen display region.

In an embodiment of the disclosure, the second camera device 112 may include a plurality of camera devices (e.g., a dual camera or a triple camera). However, the second camera device 112 may not be limited to the above example where a plurality of camera devices are included therein. For example, the second camera device 112 may include one camera device.

The camera devices 105 and 112 may include one or more lenses, an image sensor, and/or an image signal processor. The flash 113 may include, for example, a light-emitting diode or a xenon lamp. In an embodiment of the disclosure, two or more lenses (e.g., infrared camera, wide-angle, and telephoto lenses) and image sensors may be disposed on one surface of the electronic device 100.

The key input devices 117 may be disposed on the side surface 110C of the housing 110. In another embodiment of the disclosure, the electronic device 100 may not include all or a part of the key input devices 117 mentioned above, and a key input device(s) 117 not included therein may be implemented on the display 101 in the form of a soft key. In an embodiment of the disclosure, the key input devices 117 may include a sensor module (e.g., the sensor 138 of FIG. 3) forming the sensing region 110F included in the screen display region (110A, 110D).

The light-emitting device 106 may be disposed, for example, on the first surface 110A of the housing 110. The light-emitting device 106 may provide status information of the electronic device 100, for example, in the form of light. In another embodiment of the disclosure, the light-emitting device 106 may provide, for example, a light source that operates in conjunction with an operation of the first camera device 105. The light-emitting device 106 may include, for example, a light-emitting diode (LED), an IR LED, and a xenon lamp.

The connector hole (108, 109) may include the first connector hole 108 capable of receiving a connector (e.g., a universal serial bus (USB) connector) for exchanging a power and/or data with an external electronic device, and/or the second connector hole 109 (e.g., an earphone jack) capable of receiving a connector for exchanging an audio signal with the external electronic device.

Figure 3:
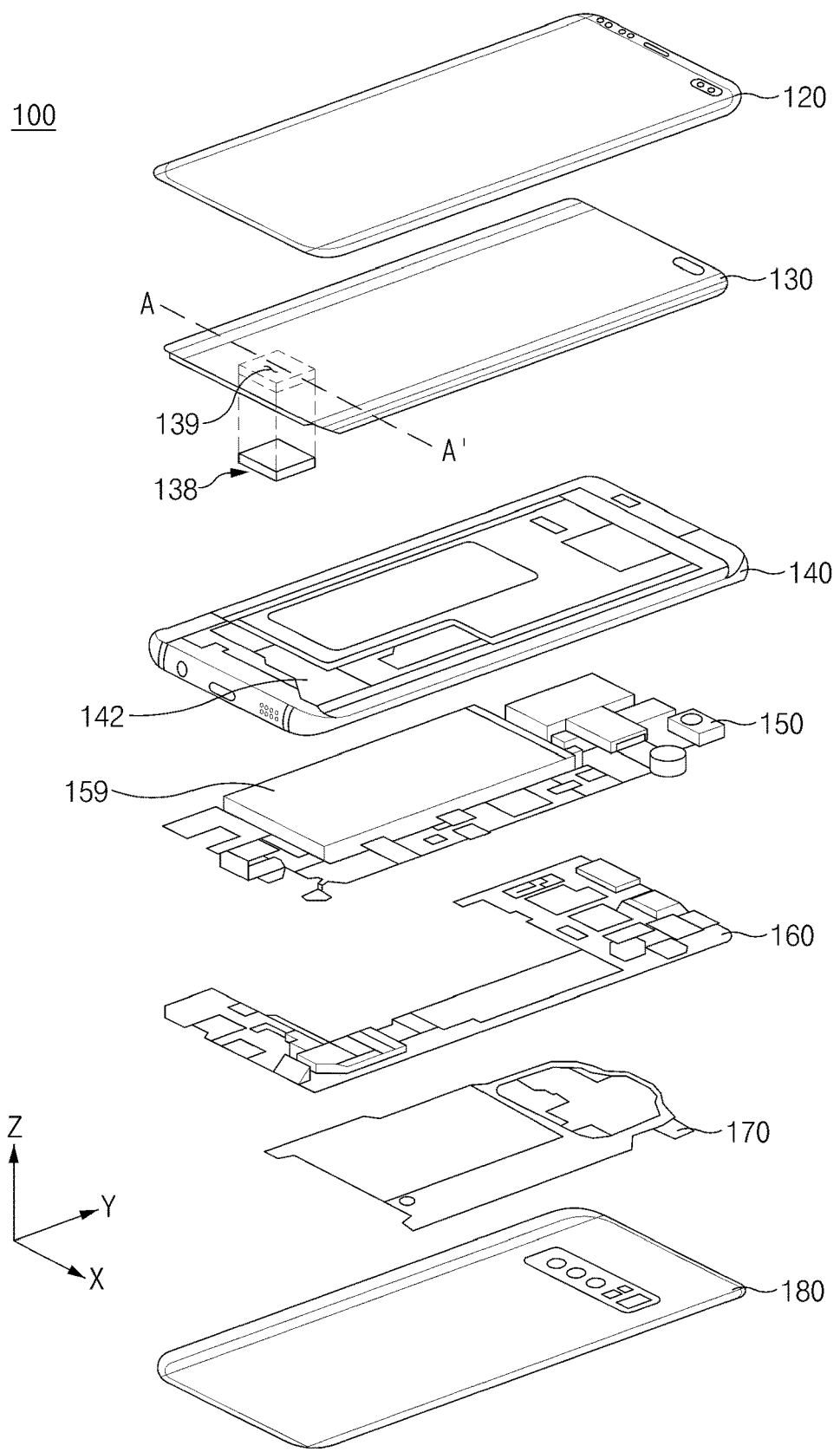
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 100 may include a front plate 120 (e.g., the front surface 110A and the first regions 110D of FIG. 1), a display 130 (e.g., the display 101 of FIG. 1), a bracket 140 (e.g., a portion of the side surface 110C of FIG. 1), a first support member 142 (e.g., a plate structure), a printed circuit board 150, a battery 159, a second support member 160, an antenna 170, and a back plate 180 (e.g., the back surface 110B and the second regions 110E of FIG. 1). In an embodiment of the disclosure, the electronic device 100 may not include at least one (e.g., the first support member 142 or the second support member 160) of the components or may further include any other component. At least one of the components of the electronic device 100 may be identical or similar to at least one of the components of the electronic device 100 of FIG. 1 or 2, and thus, additional description will be omitted to avoid redundancy.

The first support member 142 may be disposed within the electronic device 100 so as to be connected with the bracket 140, or may be integrally formed with the bracket 140. The first support member 142 may be formed of, for example, a metal material and/or a nonmetal material (e.g., a polymer). The display 130 may be coupled to one surface of the first support member 142, and the printed circuit board 150 may be coupled to an opposite surface of the first support member 142. A processor, a memory, and/or an interface may be mounted on the printed circuit board 150. The processor may include, for example, one or more of a central processing unit, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect, for example, the electronic device 100 with an external electronic device and may include a USB connector, an SD card/multimedia card (MMC) connector, or an audio connector.

The battery 159 that is a device for supplying a power to at least one component of the electronic device 100 may include, for example, a primary cell incapable of being recharged, a secondary cell rechargeable, or a fuel cell. At least a portion of the battery 159 may be disposed on substantially the same plane as the printed circuit board 150, for example. The battery 159 may be integrally disposed within the electronic device 100 or may be disposed to be removable from the electronic device 100.

The antenna 170 may be interposed between the back plate 180 and the battery 159. The antenna 170 may include, for example, a near field communication (NFC) antenna, an antenna for wireless charging, and/or a magnetic secure transmission (MST) antenna. For example, the antenna 170 may perform short range communication with an external device or may wirelessly transmit/receive a power necessary to charge. In another embodiment of the disclosure, an antenna structure may be implemented with a portion of the bracket 140 and/or the first support member 142, or with a combination thereof.

Figure 4A:
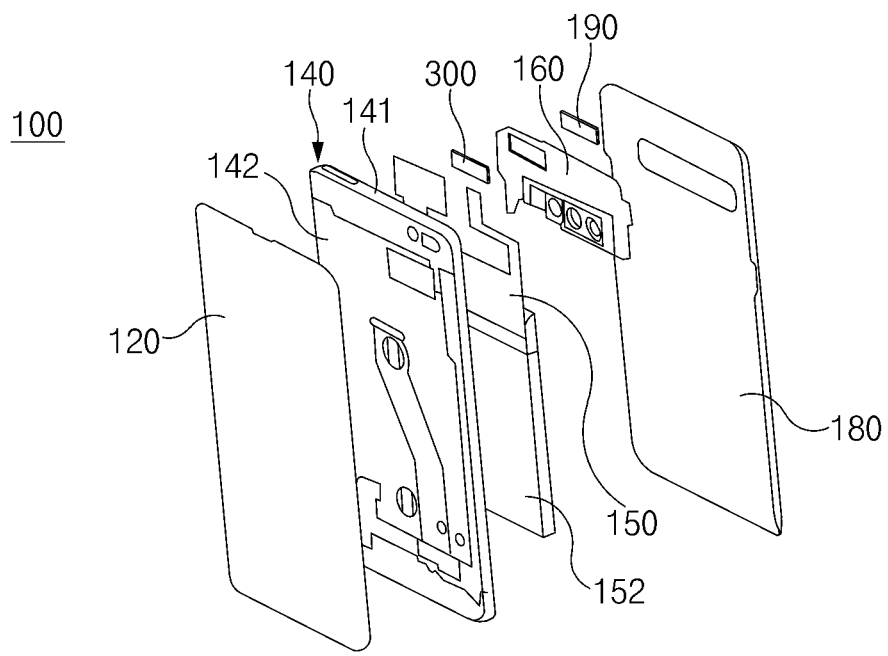
FIGS. 4A and 4B are exploded perspective views of an electronic device according to various embodiments of the disclosure.
Figure 4B:
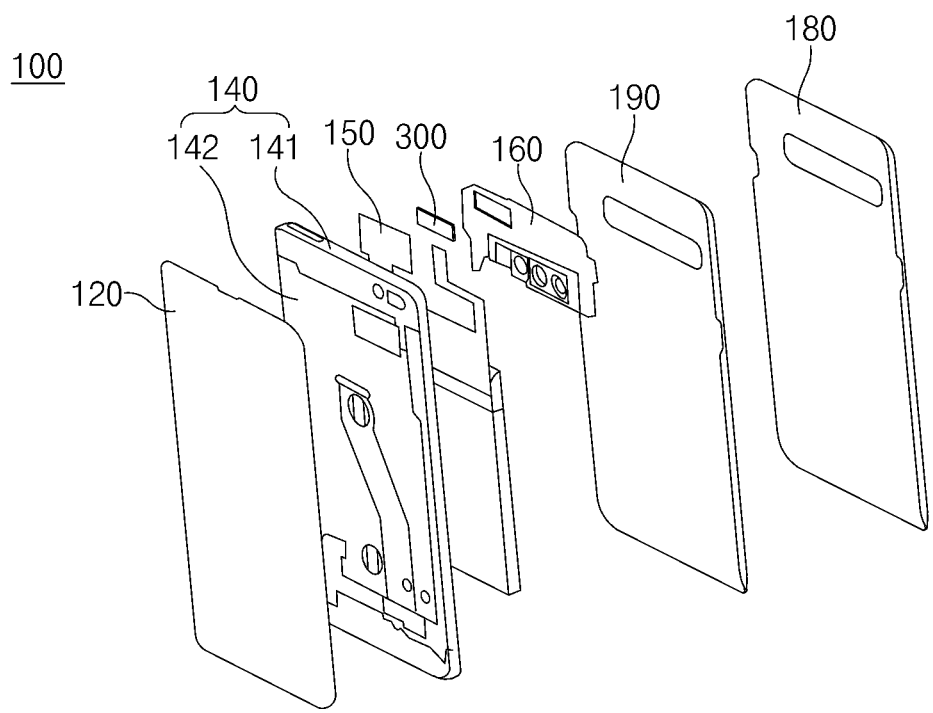

FIGS. 4A and 4B are exploded perspective views of an electronic device according to various embodiments of the disclosure.

Referring to FIGS. 4A and 4B, in an embodiment of the disclosure, the electronic device 100 (e.g., an electronic device 1501 of FIG. 15) may include the front plate 120, the bracket 140, the printed circuit board 150, an antenna structure 300 (e.g., an antenna module 1646 of FIG. 17), the support member 160, a reinforcing member 190, and/or the back plate 180.

In an embodiment of the disclosure, the front plate 120 may form a front surface of the electronic device 100. At least a portion of the front plate 120 may be formed to be transparent such that a display (e.g., the display 130 of FIG. 3) of the electronic device 100 is visually exposed. The front plate 120 may face the back plate 180. An edge of the front plate 120 may be connected with a portion of the bracket 140. In various embodiments of the disclosure, the front plate 120 may be integrally formed with the display. For example, the front plate 120 may include one or more of layers included in the display.

In an embodiment of the disclosure, the back plate 180 may form a back surface of the electronic device 100. At least a portion of the back plate 180 may be formed to be transparent such that a camera is visually exposed. For another example, the back plate 180 may include at least one through hole such that a camera is visually exposed. The back plate 180 may face the front plate 120. An edge of the back plate 180 may be connected with a portion of the bracket 140.

According to various embodiments of the disclosure, the back plate 180 may include a nonmetal material having a given dielectric coefficient. For example, the back plate 180 may include a ceramic material. In an embodiment of the disclosure, the reinforcing member 190 that is formed of a polymer material may be disposed on an inner surface of the back plate 180.

In an embodiment of the disclosure, the bracket 140 may include the first support member 142 and a frame structure 141, and the frame structure 141 may surround a peripheral portion of the first support member 142 to form a surface of the electronic device 100. The bracket 140 may be interposed between the front plate 120 and the back plate 180. The display may be disposed on one surface of the first support member 142, and the printed circuit board 150 and a battery 152 may be disposed on an opposite surface of the first support member 142. The bracket 140 may include a metal material and/or a nonmetal material. For example, the bracket 140 may include a ceramic material. The frame structure 141 may be connected with the edge of the front plate 120 and the edge of the back plate 180. The frame structure 141 may constitute a housing structure, which includes an inner space, together with the front plate 120 and the back plate 180.

In an embodiment of the disclosure, the printed circuit board 150 and the battery 152 may be interposed between the first support member 142 of the bracket 140 and the back plate 180.

In an embodiment of the disclosure, the antenna structure 300 may form a beam for radiating an RF signal. For example, the RF signal may have a frequency band of approximately 23 gigahertz (GHz) or more. For another example, the RF signal may have a wavelength of tens millimeters or less. In an embodiment of the disclosure, the antenna structure 300 may be interposed between the first support member 142 of the bracket 140 and the back plate 180. The antenna structure 300 may be disposed on the printed circuit board 150 or may be electrically connected with the printed circuit board 150. For another example, the antenna structure 300 may be disposed in an opening formed at the support member 160. The antenna structure 300 may be disposed to face the reinforcing member 190 that is formed of a material different from that of the back plate 180.

In an embodiment of the disclosure, the support member 160 may be interposed between the printed circuit board 150 and the back plate 180. In an embodiment of the disclosure, the support member 160 may include an opening, in which the antenna structure 300 is disposed, therein. The support member 160 may include an insulating material. In various embodiments of the disclosure, a conductive pattern that functions as an antenna may be formed at the support member 160.

In an embodiment of the disclosure, the front plate 120, the back plate 180, and the frame structure 141 of the bracket 140 may be referred to as a "housing structure" including an inner space where an electronic component and an instrument are disposed. The support member 160 and the first support member 142 of the bracket 140 may be, for example, an inner structure disposed within the housing structure. The antenna structure 300 and the printed circuit board 150 may be disposed in the inner space of the housing structure.

In an embodiment of the disclosure, the reinforcing member 190 may provide the back plate 180 with a mechanical rigidity. For example, the reinforcing member 190 may include a polymer material. The polymer material may have a dielectric coefficient different from that of the nonmetal material included in the back plate 180.

Referring to FIG. 4A, according to an embodiment of the disclosure, the reinforcing member 190 may have substantially the same size as the antenna structure 300. For example, the reinforcing member 190 may be formed by injection molding a polymer material on the inner surface of the back plate 180. In various embodiments of the disclosure, the reinforcing member 190 may be formed in a partial region of the back plate 180. A region of the back plate 180, through which an RF signal passes, may be of a specified thickness associated with a wavelength of the RF signal. The region of the back plate 180, through which the RF signal passes, may have a thickness different from that of the remaining region of the back plate 180. For example, the region of the back plate 180, through which the RF signal passes, may have a first thickness, and the remaining region thereof may have a second thickness greater than the first thickness. The first thickness may fail to provide the back plate 180 with a sufficient strength. In an embodiment of the disclosure, the reinforcing member 190 may be formed to reinforce a mechanical rigidity of the region of the back plate 180, which has the first thickness.

Referring to FIG. 4B, according to an embodiment of the disclosure, the reinforcing member 190 may be formed in a shape substantially corresponding to that of the back plate 180. One surface of the reinforcing member 190 may face the printed circuit board 150, and an opposite surface of the reinforcing member 190 may face the back plate 180. The reinforcing member 190 may be stacked on the inner surface of the back plate 180 to reinforce a mechanical rigidity of the back plate 180 on the whole. For example, the reinforcing member 190 may be formed of a polymer material. An RF signal radiated from the antenna structure 300 may pass through the reinforcing member 190 and the back plate 180. The reinforcing member 190 may be formed to have a given thickness. For example, the given thickness may be associated with the mechanical rigidity of the back plate 180.

Figure 5:
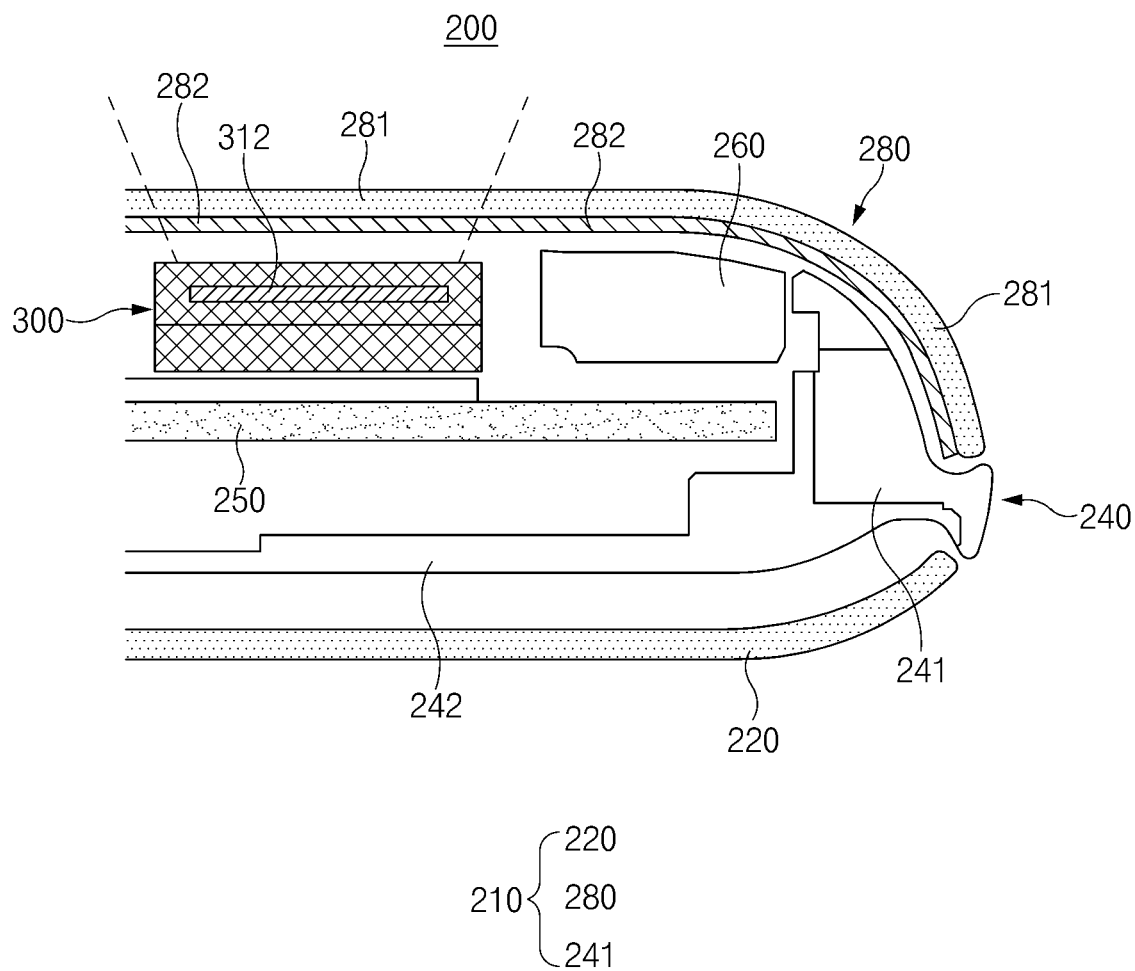
FIG. 5 is a cross-sectional view of an electronic device according to an embodiment of the disclosure.

FIG. 5 is a cross-sectional view of an electronic device according to an embodiment of the disclosure.

Referring to FIG. 5, in an embodiment of the disclosure, an electronic device 200 (e.g., the electronic device 100 of FIGS. 4A and 4B) may include a housing structure 210, the antenna structure 300, a printed circuit board 250 (e.g., the printed circuit board 150 of FIG. 4A), and/or a support member 260 (e.g., the support member 160 of FIGS. 4A and 4B).

In an embodiment of the disclosure, the housing structure 210 may include a front plate 220 (e.g., the front plate 120 of FIGS. 4A and 4B), a back plate 280 (e.g., the back plate 180 of FIGS. 4A and 4B), and a bracket 240 (e.g., the bracket 140 of FIGS. 4A and 4B). The antenna structure 300, the printed circuit board 250 (e.g., the printed circuit board 150 of FIG. 4A), and the support member 260 (e.g., the support member 160 of FIGS. 4A and 4B) may be included within the housing structure 210.

In an embodiment of the disclosure, an edge of the front plate 220 may be extended toward a frame structure 241 of the bracket 240. For example, an edge portion of the front plate 220 may be formed in the shape of a curved surface extended toward the frame structure 241 of the bracket 240. The front plate 220 may form an inner space of the housing structure 210 together with the back plate 280 and the frame structure 241 of the bracket 240.

In an embodiment of the disclosure, the bracket 240 may include the frame structure 241 forming a surface (e.g., a side surface) of the electronic device 200, and/or a plate structure 242 extended from the frame structure 241 to the inner space. The frame structure 241 may be connected with an edge of each of the front plate 220 and the back plate 280. In the embodiment of the disclosure, the printed circuit board 250 and a display may be disposed on the plate structure 242. In an embodiment of the disclosure, the printed circuit board 250, the antenna structure 300, and/or the support member 260 may be interposed between the plate structure 242 and the back plate 280. The display (e.g., the display 130 of FIG. 3) may be interposed between the plate structure 242 and the front plate 220.

In an embodiment of the disclosure, the back plate 280 may form a back surface of the electronic device 200. The back plate 280 may include a flat region and a curved region extended toward the frame structure 241 of the bracket 240 from an edge of the flat region. The back plate 280 may form the inner space of the housing structure 210 together with the front plate 220 and the frame structure 241 of the bracket 240.

In an embodiment of the disclosure, the back plate 280 may include a ceramic portion 281 including a ceramic material, and a polymer portion 282 including a polymer material. The ceramic portion 281 may form an outer surface of the housing structure 210. The polymer portion 282 may be formed on an inner surface of the ceramic portion 281. The polymer portion 282 may be referred to as the "reinforcing member 190" of FIGS. 4A and 4B. The polymer portion 282 may reinforce a mechanical rigidity of the ceramic portion 281. In an embodiment of the disclosure, the polymer portion 282 may be formed on the inner surface of the ceramic portion 281 through injection-molding. The polymer portion 282 may have a property (e.g., a thickness) associated with a frequency of an RF signal radiated from the antenna structure 300.

In an embodiment of the disclosure, a ratio of a thickness of the polymer portion 282 to a thickness of the back plate 280 (i.e., $$\frac{\text{a thickness of the polymer portion 282}}{\text{a thickness of the back plate 280}}$$

) hereinafter referred to as a "thickness ration") may be substantially uniform. In various embodiments of the disclosure, a thickness of the back plate 280 may be substantially the same as a sum of the thickness of the polymer portion 282 and the thickness of the ceramic portion 281, but the disclosure is not limited thereto.

In various embodiments of the disclosure, the thickness ratio may vary depending on a frequency of an RF signal radiated from the antenna structure 300. For example, the thickness of the ceramic portion 281 may be associated with a wavelength of the RF signal. For another example, the polymer portion 282 may have a thickness capable of reinforcing a specified mechanical rigidity of the ceramic portion 281.

In an embodiment of the disclosure, the antenna structure 300 may include a conductive pattern 312 (e.g., an antenna array 1730 of FIG. 17) formed therein or thereon. The conductive pattern 312 may radiate an RF signal having a given frequency by a feeding signal. The antenna structure 300 may form a beam for radiating an RF signal to the outside of the electronic device 200. In this case, the beam may pass through the ceramic portion 281 and the polymer portion 282 of the back plate 280. The antenna structure 300 may be disposed to be spaced apart from the back plate 280 as much as a given interval.

Figure 6:
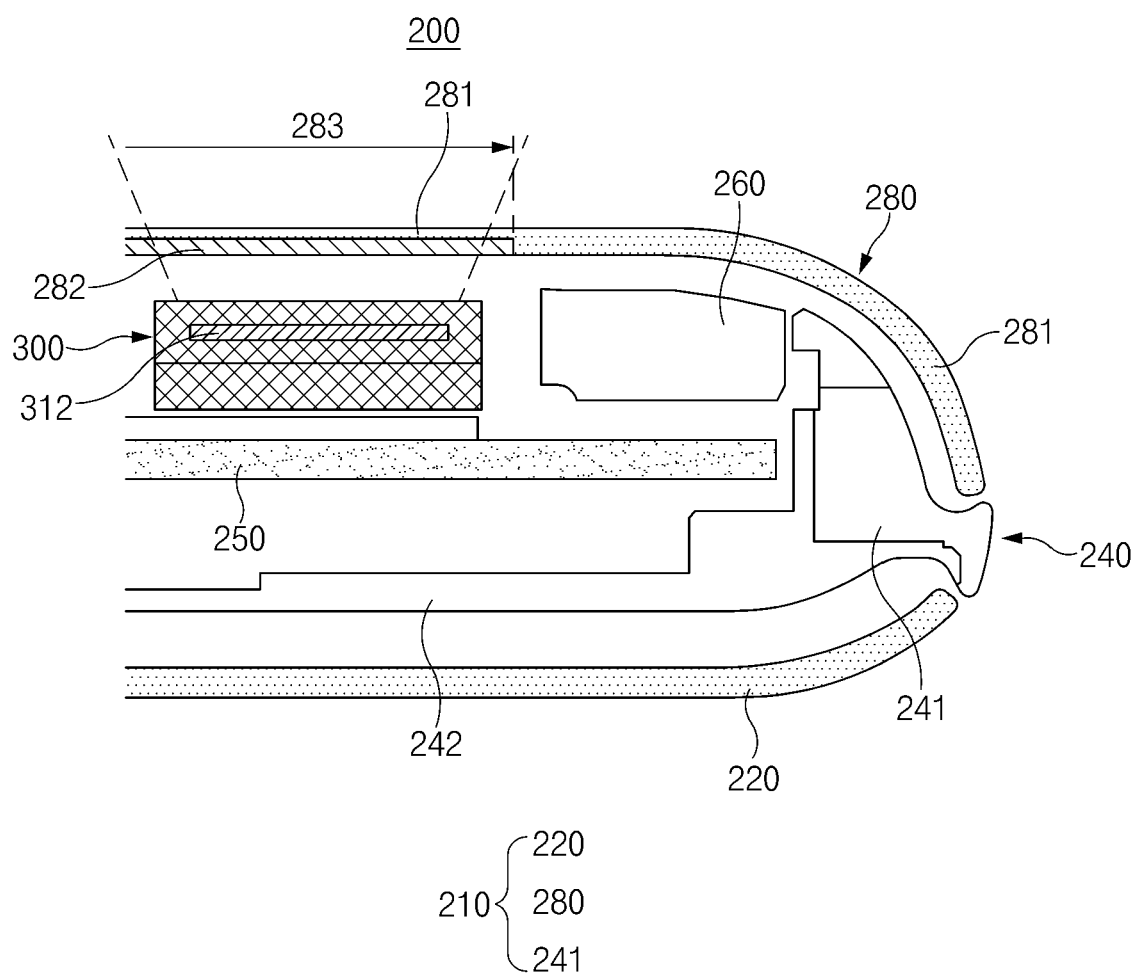
FIG. 6 is a cross-sectional view of an electronic device according to an embodiment of the disclosure.

FIG. 6 is a cross-sectional view of an electronic device according to an embodiment of the disclosure.

Below, in describing an embodiment of the disclosure, the description given with reference to FIG. 5 will be omitted to avoid redundancy.

Referring to FIG. 6, in an embodiment of the disclosure, the electronic device 200 may include the housing structure 210, the antenna structure 300, the printed circuit board 250, and/or the support member 260 disposed within the housing structure 210. The housing structure 210 may be formed by the front plate 220, the back plate 280, and the frame structure 241 of the bracket 240.

In an embodiment of the disclosure, the back plate 280 may include a first portion 283 through which an RF signal radiated from the antenna structure 300 passes. The ceramic portion 281 included in the first portion 283 may be formed to be thinner than the remaining portion of the back plate 280. The first portion 283 may include the ceramic portion 281 and the polymer portion 282. In an embodiment of the disclosure, the polymer portion 282 may be formed on the ceramic portion 281 included in the first portion 283 such that a thickness of the back plate 280 is substantially uniform.

In an embodiment of the disclosure, the polymer portion 282 may be formed at at least a portion of an inner surface of the ceramic portion 281. For another example, the polymer portion 282 may be formed at at least a portion of an outer surface of the housing structure 210. The polymer portion 282 may be formed in a region where a thickness of the ceramic portion 281 is small. As such, the polymer portion 282 may reinforce a mechanical rigidity of the ceramic portion 281.

In an embodiment of the disclosure, the first portion 283 and the remaining portion of the back plate 280 may be different in a ratio of a thickness of the polymer portion 282 to a thickness of the back plate 280 (i.e., $$\frac{\text{a thickness of the polymer portion 282}}{\text{a thickness of the back plate 280}}$$

) (hereinafter referred to as a "thickness ratio"). For example, the thickness ratio of the first portion 283 may be greater than the thickness ratio of the remaining portion. For example, the back plate 280 may be formed such that the thickness ratio of the first portion 283 is greater than "0" and the thickness ratio of the remaining portion is "0". For example, the remaining portion of the back plate 280 may not include a polymer material.

In various embodiments of the disclosure, a thickness of the back plate 280 may be substantially the same as a sum of the thickness of the polymer portion 282 and the thickness of the ceramic portion 281 of the first portion 283, but the disclosure is not limited thereto.

In various embodiments of the disclosure, the thickness ratio of the first portion 283 may vary depending on a frequency of an RF signal radiated from the antenna structure 300. For example, the thickness of the ceramic portion 281 of the first portion 283 may be associated with a wavelength of the RF signal. For another example, the polymer portion 282 of the first portion 283 may have a thickness capable of reinforcing a specified mechanical rigidity of the ceramic portion 281.

In various embodiments of the disclosure, the first portion 283 is illustrated as included in a flat region of the back plate 280, but the disclosure is not limited thereto. For example, the first portion 283 may be included in a flat and/or curved region of the back plate 280 depending on a radiation direction or placement of the antenna structure 300.

Figure 7:
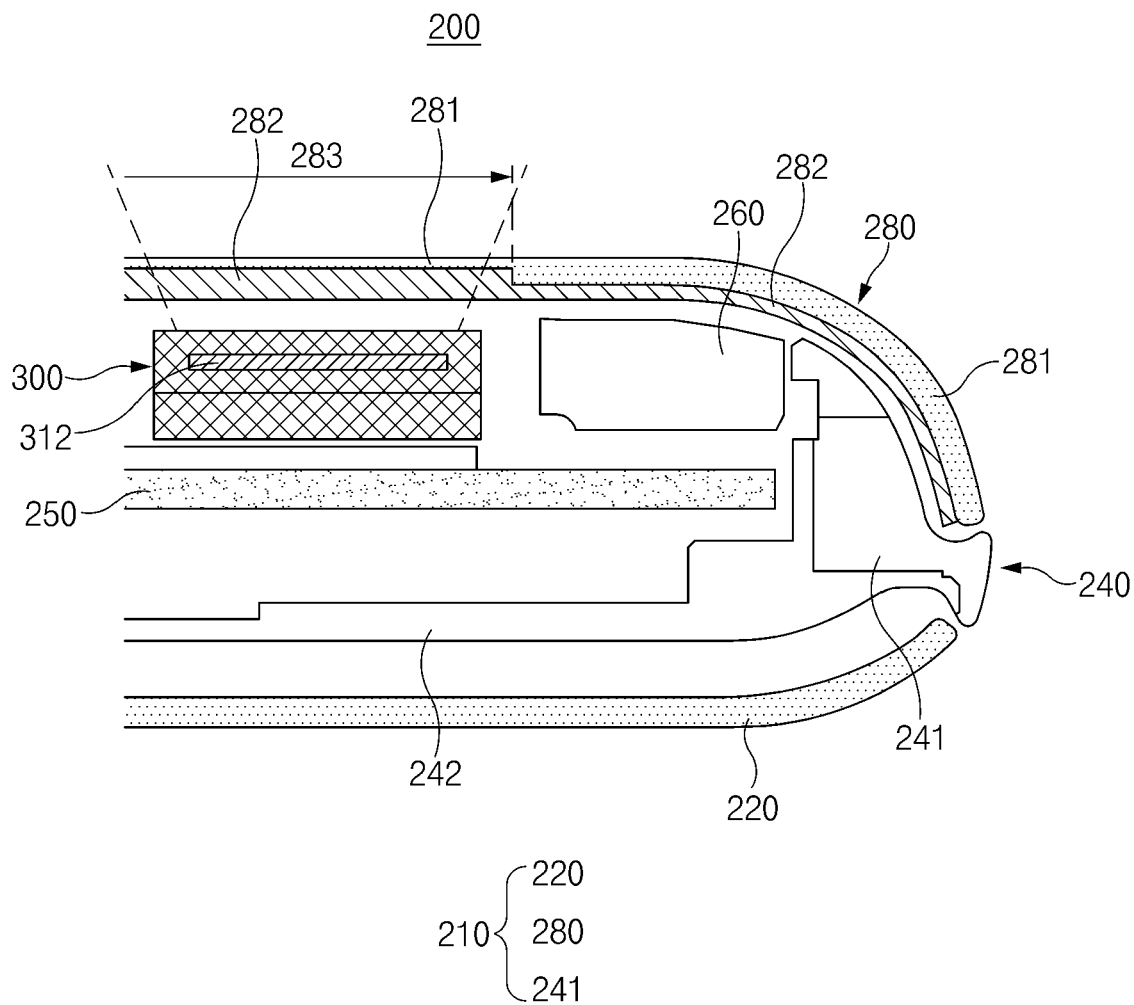
FIG. 7 is a cross-sectional view of an electronic device according to an embodiment of the disclosure.

FIG. 7 is a cross-sectional view of an electronic device according to an embodiment of the disclosure.

Below, in describing the embodiment that is illustrated, the description given with reference to FIGS. 5 and 6 will be omitted to avoid redundancy.

Referring to FIG. 7, in an embodiment of the disclosure, the electronic device 200 may include the housing structure 210, the antenna structure 300 disposed within the housing structure 210, the printed circuit board 250, and/or the support member 260. The housing structure 210 may be formed by the front plate 220, the back plate 280, and the frame structure 241 of the bracket 240.

In an embodiment of the disclosure, the back plate 280 may include the ceramic portion 281 including a ceramic material, and the polymer portion 282 including a polymer material. The ceramic portion 281 may form an outer surface of the housing structure 210. The polymer portion 282 may be formed on an inner surface of the ceramic portion 281. In an embodiment of the disclosure, the polymer portion 282 may be formed on the inner surface of the ceramic portion 281 through injection-molding. The polymer portion 282 may reinforce a mechanical rigidity of the ceramic portion 281. The polymer portion 282 may be referred to as the "reinforcing member 190" of FIGS. 4A and 4B.

In an embodiment of the disclosure, the back plate 280 may include the first portion 283 through which an RF signal radiated from the antenna structure 300 passes. The ceramic portion 281 of the first portion 283 may be formed to be thinner than that of the remaining portion of the back plate 280. The polymer portion 282 of the first portion 283 may be formed to be thicker than that of the remaining portion of the back plate 280. In various embodiments of the disclosure, a thickness of the back plate 280 may be uniform on the whole. The first portion 283 is illustrated as included in a flat region of the back plate 280, but the disclosure is not limited thereto. For example, the first portion 283 may be formed in a flat and/or curved region of the back plate 280 depending on a beam coverage formed by the antenna structure 300 and a radiation direction of the antenna structure 300.

In an embodiment of the disclosure, the first portion 283 and the remaining portion of the back plate 280 may be different in a ratio of a thickness of the polymer portion 282 to a thickness of the back plate 280 (i.e., $$\frac{\text{a thickness of the polymer portion 282}}{\text{a thickness of the back plate 280}}$$

) (hereinafter referred to as a "thickness ratio"). For example, the thickness ratio of the first portion 283 may be greater than the thickness ratio of the remaining portion. For example, in the back plate 280 illustrated in FIG. 7, the thickness ratio of the first portion 283 may be greater than the thickness ratio of the remaining portion. For example, the amount of polymer material included in the first portion 283 may be greater than that included in the remaining portion.

In various embodiments of the disclosure, a thickness of the back plate 280 may be substantially the same as a sum of the thickness of the polymer portion 282 of the first portion 283 and the thickness of the ceramic portion 281 of the first portion 283, but the disclosure is not limited thereto.

In various embodiments of the disclosure, the thickness ratio of the first portion 283 may vary depending on a frequency of an RF signal radiated from the antenna structure 300. For example, the thickness of the ceramic portion 281 of the first portion 283 may be associated with a wavelength of the RF signal. For another example, the polymer portion 282 of the first portion 283 may have a thickness capable of reinforcing a specified mechanical rigidity of the ceramic portion 281.

Various embodiments are not limited to the example where the back plate 280 includes the ceramic portion 281 and the polymer portion 282. For example, the back plate 280 may include a nonmetal portion including a nonmetal material having a given dielectric coefficient, and the polymer portion 282 for reinforcing a mechanical rigidity of the nonmetal portion.

Figure 8:
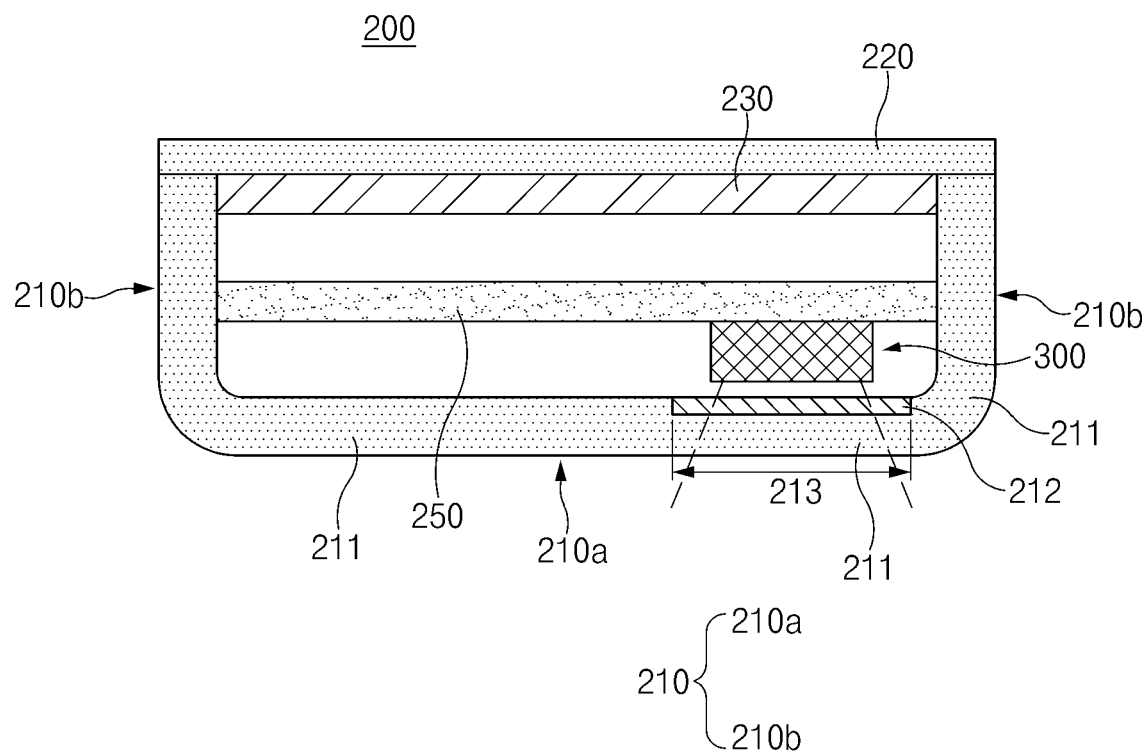
FIG. 8 is a cross-sectional view of an electronic device according to an embodiment of the disclosure.

FIG. 8 is a cross-sectional view of an electronic device according to an embodiment of the disclosure.

Figure 9:
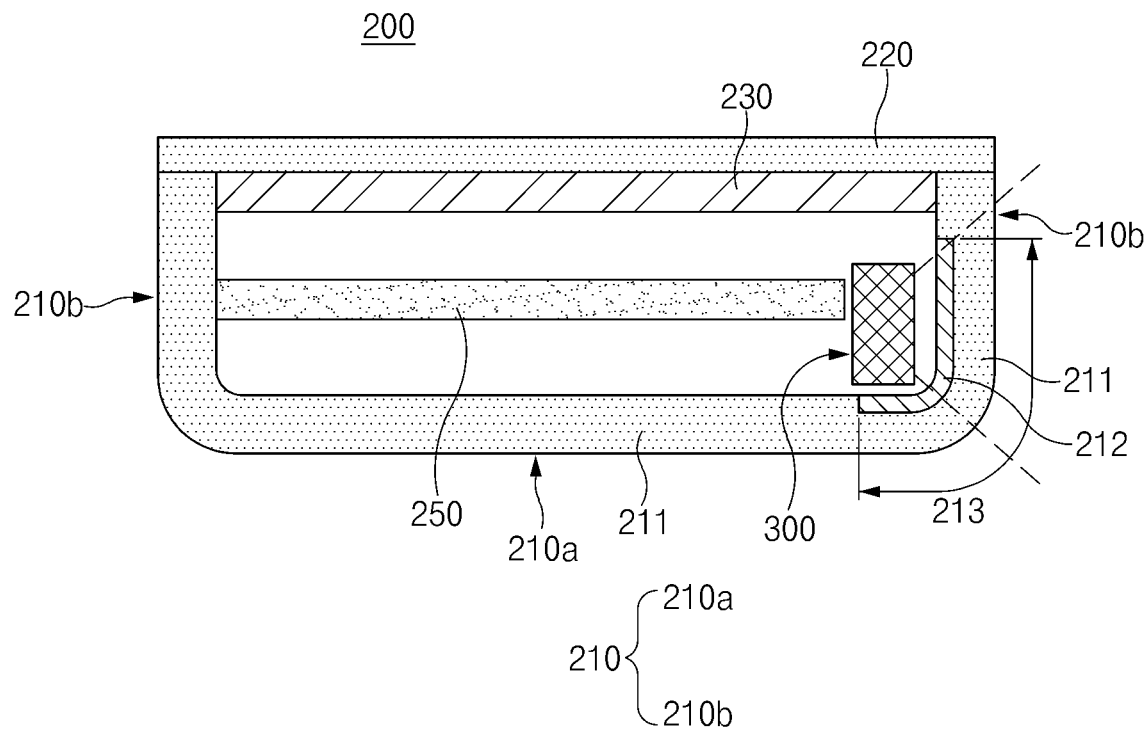
FIG. 9 is a cross-sectional view of an electronic device according to an embodiment of the disclosure.

FIG. 9 is a cross-sectional view of an electronic device according to an embodiment of the disclosure.

Referring to FIGS. 8 and 9, the electronic device 200 may include the front plate 220 forming a front surface, and the housing structure 210 coupled to the front plate 220 to form an inner space together with the front plate 220. The housing structure 210 may include a first structure 210a forming a back surface of the electronic device 200 and facing the front plate 220, and a second structure 210b extended from the first structure 210a to an edge of the front plate 220. The second structure 210b may form a side surface of the electronic device 200.

In an embodiment of the disclosure, the front plate 220 may be implemented with one or more of a plurality of layers included in a display 230. In an embodiment of the disclosure, the printed circuit board 250, the antenna structure 300, and/or the display 230 may be disposed within the housing structure 210.

In an embodiment of the disclosure, the housing structure 210 may include a polymer portion 212 that is formed at at least a portion of an inner surface thereof and includes a polymer material. In an embodiment of the disclosure, the polymer portion 212 may be formed at the first structure 210a and/or the second structure 210b. In an embodiment of the disclosure, the polymer portion 212 may be formed to include a region through which an RF signal radiated from the antenna structure 300 passes.

In various embodiments of the disclosure, the housing structure 210 may include a ceramic portion 211 including a ceramic material, and the polymer portion 212 formed at at least a portion of an inner surface of the ceramic portion 211.

In various embodiments of the disclosure, the housing structure 210 may include a first portion 213 through which an RF signal radiated from the antenna structure 300 passes. When viewed from above the first structure 210a, at least a portion of the first portion 213 may overlap the antenna structure 300. The first portion 213 may include the polymer portion 212 formed on the inner surface of the ceramic portion 211. The ceramic portion 211 included in the first portion 213 may be formed to be thinner than a ceramic portion included in the remaining portion of the housing structure 210. The polymer portion 212 included in the first portion 213 may be formed to reinforce a specified mechanical rigidity of the ceramic portion 211.

In various embodiments of the disclosure, the polymer portion 212 may be formed at any other portion of the housing structure 210 as well as the first portion 213.

Referring to FIG. 8, the antenna structure 300 may be disposed such that an RF signal is radiated through at least a portion (e.g., the first portion 213) of the first structure 210a. The antenna structure 300 may be disposed to be spaced apart from the first structure 210a as much as a given interval. For example, the polymer portion 212 may be formed at at least a portion of an inner surface of the first structure 210a of the housing structure 210. For another example, the polymer portion 212 may be formed at at least a portion of an outer surface of the first structure 210a of the housing structure 210. The polymer portion 212 may be formed to at least include a portion (e.g., the first portion 213) of the housing structure 210, through which an RF signal passes.

Referring to FIG. 9, the antenna structure 300 may be disposed such that at least a portion of an RF signal is radiated through the second structure 210b of the housing structure 210. The antenna structure 300 may be disposed to be spaced apart from the first structure 210a and/or the second structure 210b as much as a given interval. In this case, the polymer portion 212 may be formed at at least a portion of an inner surface of the second structure 210b of the housing structure 210 and/or at least a portion of an inner surface of the first structure 210a of the housing structure 210. In an embodiment of the disclosure, the polymer portion 212 may be formed to at least include a portion (e.g., the first portion 213) of the housing structure 210, through which an RF signal passes.

In various embodiments of the disclosure, the polymer portion 212 is not limited to the examples illustrated in FIGS. 8 and 9. For example, the polymer portion 212 may be formed in various regions of the inner surface and the outer surface of the housing structure 210.

Various embodiments are not limited to the example where the housing structure 210 includes the ceramic portion 211 and the polymer portion 212. For example, the housing structure 210 may include a nonmetal portion including a nonmetal material having a given dielectric coefficient, and the polymer portion 212 for reinforcing a mechanical rigidity of the nonmetal portion.

Figure 10:
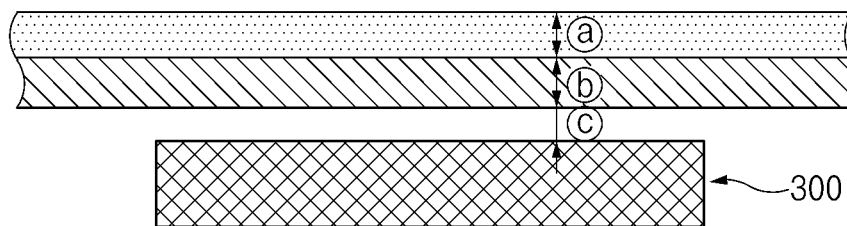
FIG. 10 is a view illustrating a relationship between a housing structure and an antenna structure of an electronic device illustrated in FIGS. 5 to 9 according to an embodiment of the disclosure.

FIG. 10 is a view illustrating a relationship between a housing structure and an antenna structure of an electronic device illustrated in FIGS. 5 to 9 according to an embodiment of the disclosure.

Here, a ceramic portion of FIG. 10 may include the ceramic portion 281 of FIGS. 5 to 7 or the ceramic portion 211 of FIGS. 8 and 9. A polymer portion of FIG. 10 may include the polymer portion 282 of FIGS. 5 to 7 or the polymer portion 212 of FIGS. 8 and 9.

Referring to FIG. 10, according to various embodiments of the disclosure, a thickness ⓐ of the ceramic portion and a thickness ⓑ of the polymer portion may be differently formed depending on a frequency of an RF signal.

In various embodiments of the disclosure, the antenna structure 300 may be formed to be spaced apart from the polymer portion as much as a given interval ⓒ. In an embodiment of the disclosure, the given interval ⓒ may be at least approximately 0.4 mm. In various embodiments of the disclosure, the antenna structure 300 may radiate RF signals in various frequency bands.

For example, the antenna structure 300 may radiate an RF signal in a first frequency band including 28 GHz. For example, the first frequency band including 28 GHz may include a frequency band having a given bandwidth within a range from 24 GHz or higher to 32 GHz or lower. In this case, the thickness ⓐ of the ceramic portion may be approximately 0.2 mm or more and approximately 0.4 mm or less. The thickness ⓑ of the polymer portion may be approximately 0.1 mm or more and approximately 0.5 mm or less for the purpose of reinforcing a specified mechanical rigidity of a back plate (e.g., the back plate 280 of FIGS. 5 to 7) and a housing structure (e.g., the housing structure 210 of FIGS. 8 and 9).

For example, the antenna structure 300 may radiate an RF signal in a second frequency band including 39 GHz. For example, the second frequency band including 39 GHz may include a frequency band having a given bandwidth within a range from 35 GHz or higher to 43 GHz or lower. In this case, the thickness ⓐ of the ceramic portion may be approximately 0.3 mm or less. The thickness ⓑ of the polymer portion may be approximately 0.5 mm or less for the purpose of reinforcing a specified mechanical rigidity of a back plate (e.g., the back plate 280 of FIGS. 5 to 7) and a housing structure (e.g., the housing structure 210 of FIGS. 8 and 9).

For example, the antenna structure 300 may radiate an RF signal in a third frequency band including 60 GHz. For example, the third frequency band including 60 GHz may include a frequency band having a given bandwidth within a range from 50 GHz or higher to 100 GHz or lower. In this case, the thickness ⓐ of the ceramic portion may be approximately 0.1 mm or more and approximately 0.2 mm or less. The thickness ⓑ of the polymer portion may be approximately 0.1 mm or more and approximately 0.5 mm or less for the purpose of reinforcing a specified mechanical rigidity of a back plate (e.g., the back plate 280 of FIGS. 5 to 7) and a housing structure (e.g., the housing structure 210 of FIGS. 8 and 9).

In various embodiments of the disclosure, a ceramic portion of a housing (e.g., the housing structure 210 of FIGS. 5 to 9) may be formed to have a property (e.g., a dielectric coefficient) appropriate for a communication characteristic (e.g., a frequency) of the antenna structure 300. For example, for an RF signal radiated from the antenna structure 300 to have a specified performance, the ceramic portion (e.g., the ceramic portion 211 of FIG. 9) of the housing (e.g., the housing structure 210 of FIG. 9) may have a given thickness. In addition, in the case where the ceramic portion having the given thickness is not of a sufficient rigidity, the housing may further include a polymer portion (e.g., the polymer portion 212 of FIG. 9) for rigidity reinforcement. In this case, the polymer portion may have a given thickness such that the housing has a specified rigidity.

Figure 11:
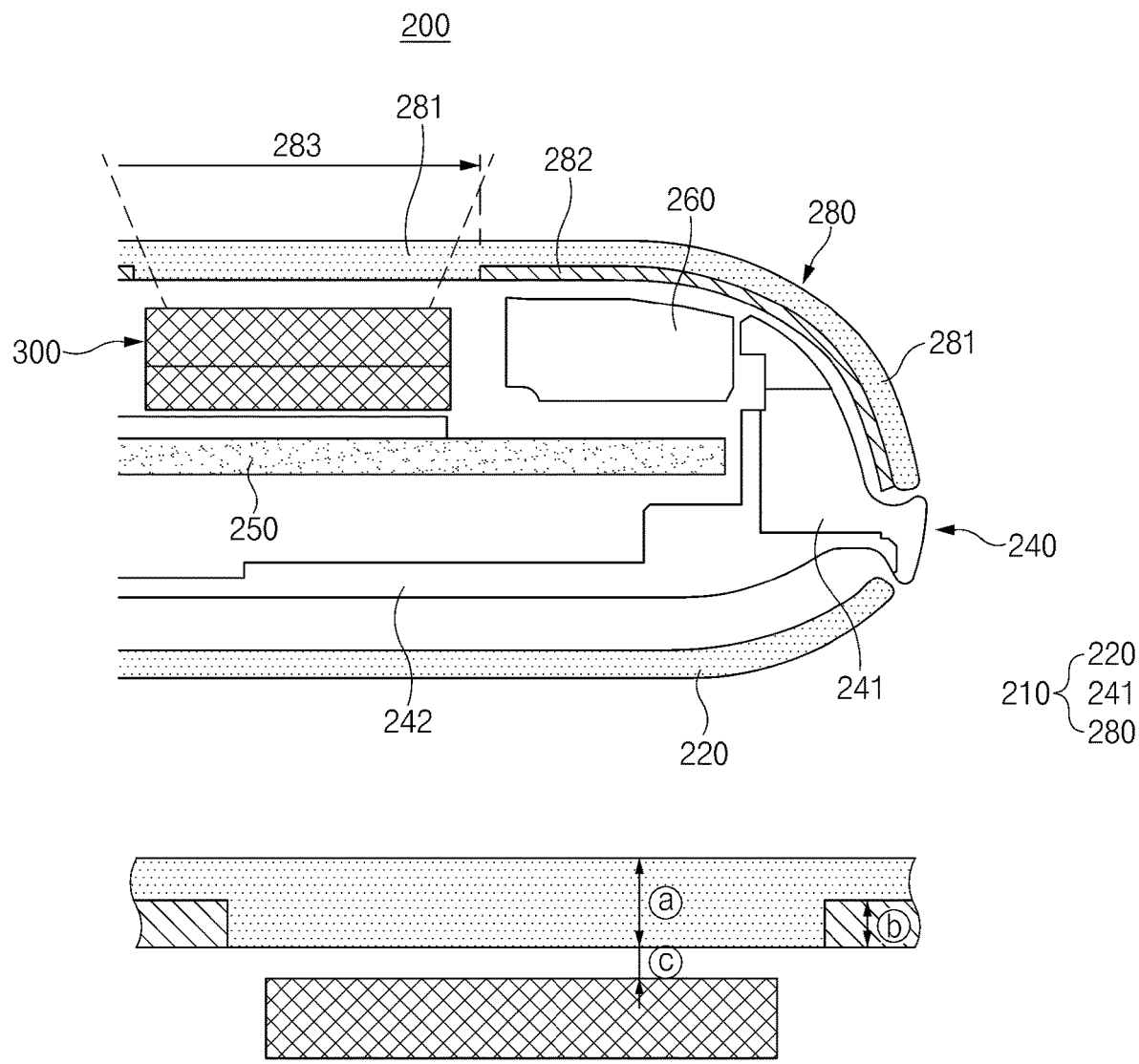
FIG. 11 is a cross-sectional view of an electronic device according to an embodiment of the disclosure.

FIG. 11 is a cross-sectional view of an electronic device according to an embodiment of the disclosure.

Referring to FIG. 11, in an embodiment of the disclosure, the electronic device 200 may include the housing structure 210, the antenna structure 300, the printed circuit board 250, and/or the support member 260.

In an embodiment of the disclosure, the housing structure 210 may include the front plate 220, the back plate 280, and/or the bracket 240. The antenna structure 300, the printed circuit board 250, and/or the support member 260 may be included within the housing structure 210

In an embodiment of the disclosure, the front plate 220 may form a front surface of the electronic device 200. At least a portion of the front plate 220 may be formed transparently such that a display (e.g., the display 130 of FIG. 3 or the display 230 of FIG. 8) is exposed to the outside of the electronic device 200. In an embodiment of the disclosure, an edge of the front plate 220 may be extended toward the frame structure 241 of the bracket 240. An edge portion of the front plate 220 may be formed in the shape of a curved surface extended toward the frame structure 241 of the bracket 240. The front plate 220 may form an inner space of the housing structure 210 together with the back plate 280 and the frame structure 241 of the bracket 240.

In an embodiment of the disclosure, the bracket 240 may include the frame structure 241 forming a surface (e.g., a side surface) of the electronic device 200, and/or the plate structure 242 extended from the frame structure 241 to the inner space. The frame structure 241 may be connected with an edge of each of the front plate 220 and the back plate 280. In the embodiment of the disclosure, the printed circuit board 250 and the display may be disposed on the plate structure 242. In an embodiment of the disclosure, the printed circuit board 250, the antenna structure 300, and/or the support member 260 may be interposed between the plate structure 242 and the back plate 280. The display may be interposed between the plate structure 242 and the front plate 220.

In an embodiment of the disclosure, the antenna structure 300 may be interposed between the back plate 280 and the printed circuit board 250. The antenna structure 300 may be disposed such that an RF signal passes through at least a portion of the back plate 280. The antenna structure 300 may be spaced apart from an inner surface of the back plate 280 as much as a given interval.

In an embodiment of the disclosure, the back plate 280 may form a back surface of the electronic device 200. In an embodiment of the disclosure, the back plate 280 may include a flat region and a curved region extended toward the frame structure 241 of the bracket 240 from an edge of the flat region. The back plate 280 may form the inner space of the housing structure 210 together with the front plate 220 and the frame structure 241 of the bracket 240.

In an embodiment of the disclosure, the back plate 280 may include the ceramic portion 281 including a ceramic material, and the polymer portion 282 including a polymer material. The back plate 280 may include the first portion 283 including only a ceramic material. The remaining portion of the back plate 280 other than the first portion 283 may include a ceramic material and a polymer material. In an embodiment of the disclosure, the first portion 283 may be formed to include a region through which an RF signal radiated from the antenna structure 300 passes. The first portion 283 may be formed of the ceramic portion 281 having a given thickness. The ceramic portion 281 of the back plate 280 may be formed to be thicker at the first portion 283 than at the remaining portion. The polymer portion 282 of the back plate 280 may be formed at the remaining portion where a thickness of the ceramic portion 281 is relatively thin. The polymer portion 282 may reinforce a mechanical rigidity of the back plate 280. The polymer portion 282 may be referred to as the "reinforcing member 190" of FIGS. 4A and 4B. In an embodiment of the disclosure, the polymer portion 282 may be formed on the inner surface of the ceramic portion 281 through injection-molding.

In an embodiment of the disclosure, the first portion 283 of the back plate 280 is illustrated as formed in a flat region of the back plate 280, but the disclosure is not limited thereto. For example, the first portion 283 of the back plate 280 may be formed in a flat and/or curved region of the back plate 280.

Referring to a table of FIG. 11, a thickness of the ceramic portion 281 included in the first portion 283 of the back plate 280 may vary depending on a frequency of an RF signal radiated from the antenna structure 300.

For example, the antenna structure 300 may radiate an RF signal having a frequency of 28 GHz. In this case, a thickness ⓐ of the ceramic portion 281 may be approximately 1.3 mm. The antenna structure 300 may be disposed to be spaced apart from the back plate 280 at least as much as approximately 0.4 mm.

For example, the antenna structure 300 may radiate an RF signal having a frequency of 39 GHz. In this case, the thickness ⓐ of the ceramic portion 281 may be approximately 1 mm. The antenna structure 300 may be disposed to be spaced apart from the back plate 280 at least as much as approximately 0.4 mm.

For example, the antenna structure 300 may radiate an RF signal having a frequency of 60 GHz. In this case, the thickness ⓐ of the ceramic portion 281 may be approximately 0.65 mm. The antenna structure 300 may be disposed to be spaced apart from the back plate 280 at least as much as approximately 0.4 mm.

Various embodiments are not limited to the example where the back plate 280 includes the ceramic portion 281 and the polymer portion 282. For example, the back plate 280 may include a nonmetal portion including a nonmetal material having a given dielectric coefficient, and the polymer portion 282 for reinforcing a mechanical rigidity of the nonmetal portion. In this case, a thickness of the nonmetal portion and a thickness of the polymer portion 282 may vary depending on an operating frequency of the antenna structure 300.

Figure 12:
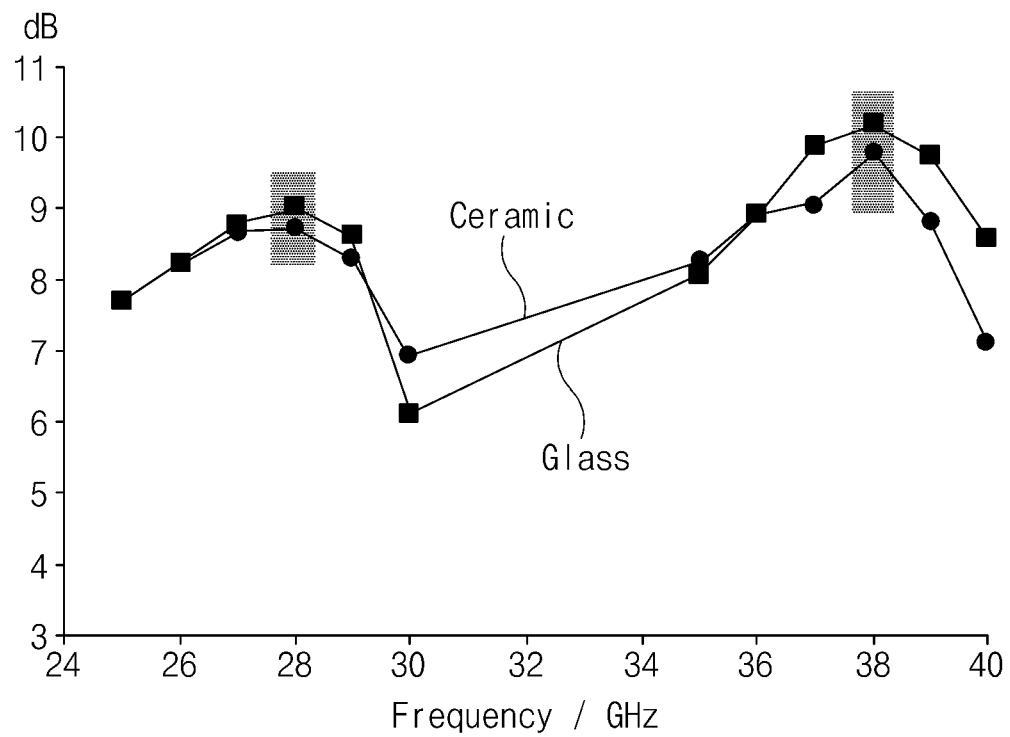
FIG. 12 is a bode plot of an embodiment illustrated in FIG. 10 and a comparative example according to an embodiment of the disclosure.

FIG. 12 is a bode plot of an embodiment illustrated in FIG. 10 and a comparative example according to an embodiment of the disclosure.

In an electronic device according to an embodiment illustrated in FIG. 12, a housing structure may include a ceramic portion (e.g., the ceramic portion 281 or 211 of FIGS. 5 to 9) formed to have a given thickness, and an antenna structure (e.g., the antenna structure 300 of FIGS. 5 to 9) may be disposed within the housing structure such that an RF signal is radiated through the ceramic portion.

In an electronic device according to a comparative example illustrated in FIG. 12, a housing structure may include a glass portion formed to have a given thickness, and an antenna structure may be disposed within the housing structure such that an RF signal is radiated through the glass portion.

Referring to FIG. 12, in a 28 GHz band, the electronic device according to the embodiment may be configured to allow each antenna structure to provide a gain of approximately 8 dB or more. For example, in the case where the ceramic portion is approximately 0.1 mm or more and approximately 0.4 mm or less in thickness (e.g., 0 of FIG. 10), the electronic device according to the embodiment may provide substantially the same wireless communication performance as the electronic device according to the comparative example.

Referring to FIG. 12, in a 39 GHz band, the electronic device according to the embodiment may be configured to allow each antenna structure to provide a gain of approximately 9 dB or more. For example, in the case where the ceramic portion is approximately 0.1 mm or more and approximately 0.3 mm or less in thickness (e.g., 0 of FIG. 10), the electronic device according to the embodiment may provide substantially the same wireless communication performance as the electronic device according to the comparative example.

Figure 13A:
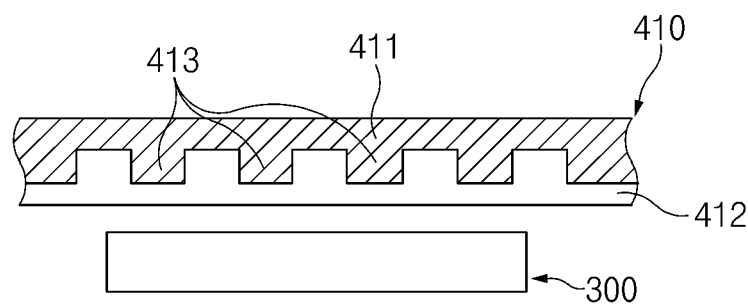
FIGS. 13A, 13B, and 13C are cross-sectional views of a housing structure of an electronic device according to various embodiments of the disclosure.
Figure 13B:
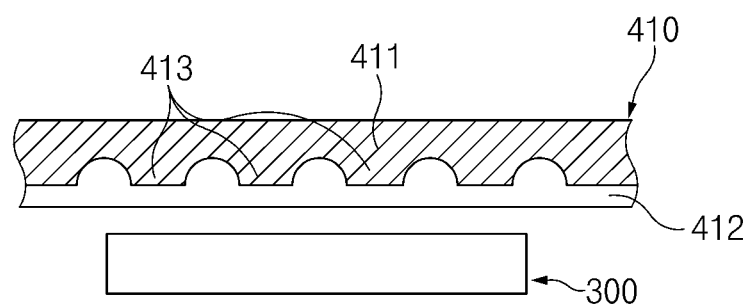
Figure 13C:
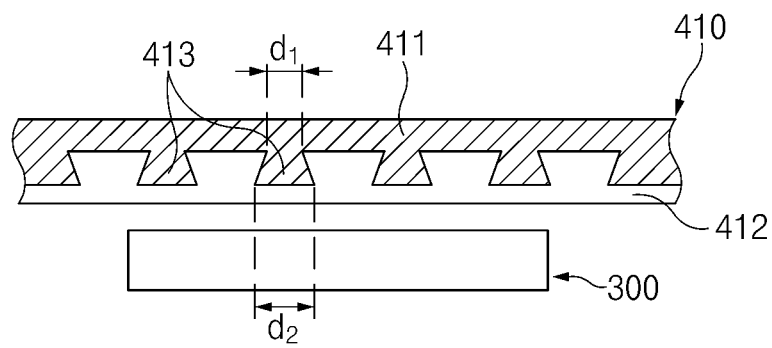

FIGS. 13A, 13B, and 13C are cross-sectional views of an electronic device according to various embodiments of the disclosure.

Referring to FIGS. 13A, 13B, and 13C, a housing structure 410 (e.g., the back plate 280 of FIG. 5 or the housing structure 210 of FIG. 8) may include a nonmetal portion 411 (e.g., the ceramic portion 281 of FIG. 5 or the ceramic portion 211 of FIG. 8), and a polymer portion 412 (e.g., the polymer portion 282 of FIG. 5 or the polymer portion 212 of FIG. 8) formed on an inner surface of the nonmetal portion 411. For example, the nonmetal portion 411 may include a nonmetal material having a given dielectric coefficient.

According to an embodiment of the disclosure, in the housing structure 410, the nonmetal portion 411 may form an outer surface of the housing structure 410, and the polymer portion 412 may be disposed to form an inner surface of the housing structure 410. The antenna structure 300 may be disposed within the housing structure 410 such that an RF signal is capable of being radiated through the polymer portion 412.

In an embodiment of the disclosure, the nonmetal portion 411 may include a concave-convex structure including a plurality of protrusions 413 formed on an inner surface thereof. In an embodiment of the disclosure, the polymer portion 412 may be formed by injection molding a polymer material on the inner surface of the nonmetal portion 411. For example, a portion of the polymer portion 412 may be filled between the plurality of protrusions 413. The concave-convex structure may increase the contact area of the nonmetal portion 411 and the polymer portion 412 and may provide a high bonding strength of the nonmetal portion 411 and the polymer portion 412. As such, the polymer portion 412 may reinforce a mechanical rigidity of the nonmetal portion 411.

Referring to FIG. 13C, the concave-convex structure may be formed such that a portion adjacent to the inner surface of the nonmetal portion 411 has a first width d1 and a portion close to the antenna structure 300 has a second width d2 greater than the first width d1. As such, the nonmetal portion 411 and the polymer portion 412 may be combined together more stably.

Figure 14A:
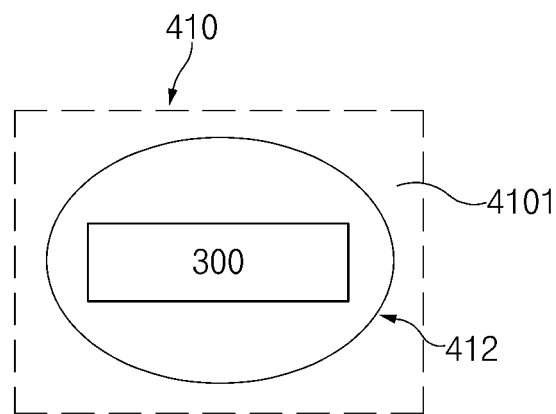
FIGS. 14A, 14B, and 14C are plan views of an electronic device according to various embodiments of the disclosure.
Figure 14B:
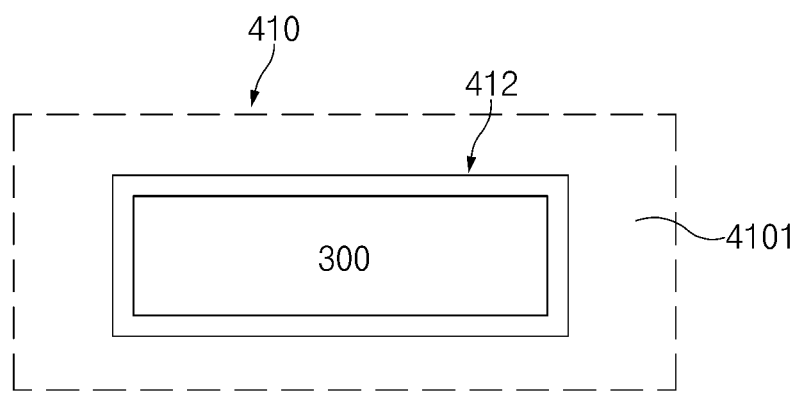
Figure 14C:
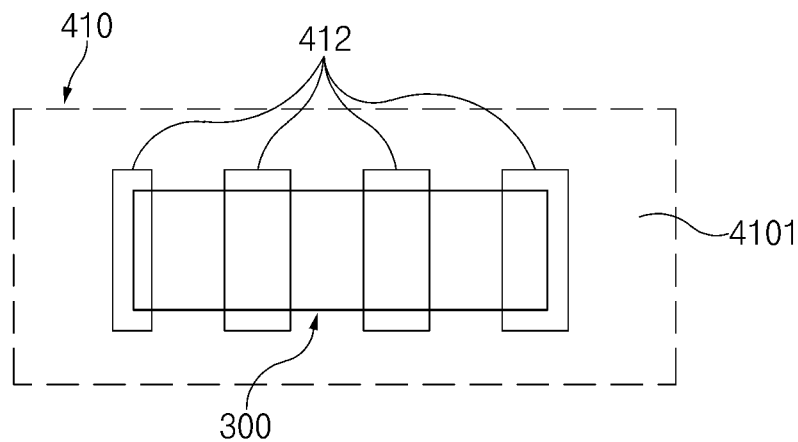

FIGS. 14A, 14B, and 14C are plan views of an electronic device according to various embodiments of the disclosure.

A housing structure illustrated in FIGS. 14A, 14B, and 14C may be a housing structure illustrated in FIGS. 5 to 10.

Referring to FIGS. 14A, 14B, and 14C, when viewed from above an inner surface 4101 of the housing structure 410, the polymer portion 412 (e.g., the polymer portion 282 of FIG. 5 or the polymer portion 212 of FIG. 8) may be formed to overlap at least a portion of the antenna structure 300.

Referring to FIGS. 14A and 14B, the polymer portion 412 may be formed to be wider than a surface (e.g., a radiation region) of the antenna structure 300 so as to overlap the whole antenna structure 300.

Referring to FIG. 14C, a plurality of polymer portions 412 may be formed to overlap portions of the antenna structure 300. For example, when viewed from above the inner surface 4101 of the housing structure 410, the plurality of polymer portions 412 may be formed to at least partially overlap a region where a conductive pattern (e.g., the antenna array 1730 of FIG. 17) included in the antenna structure 300 is formed.

Figure 15:
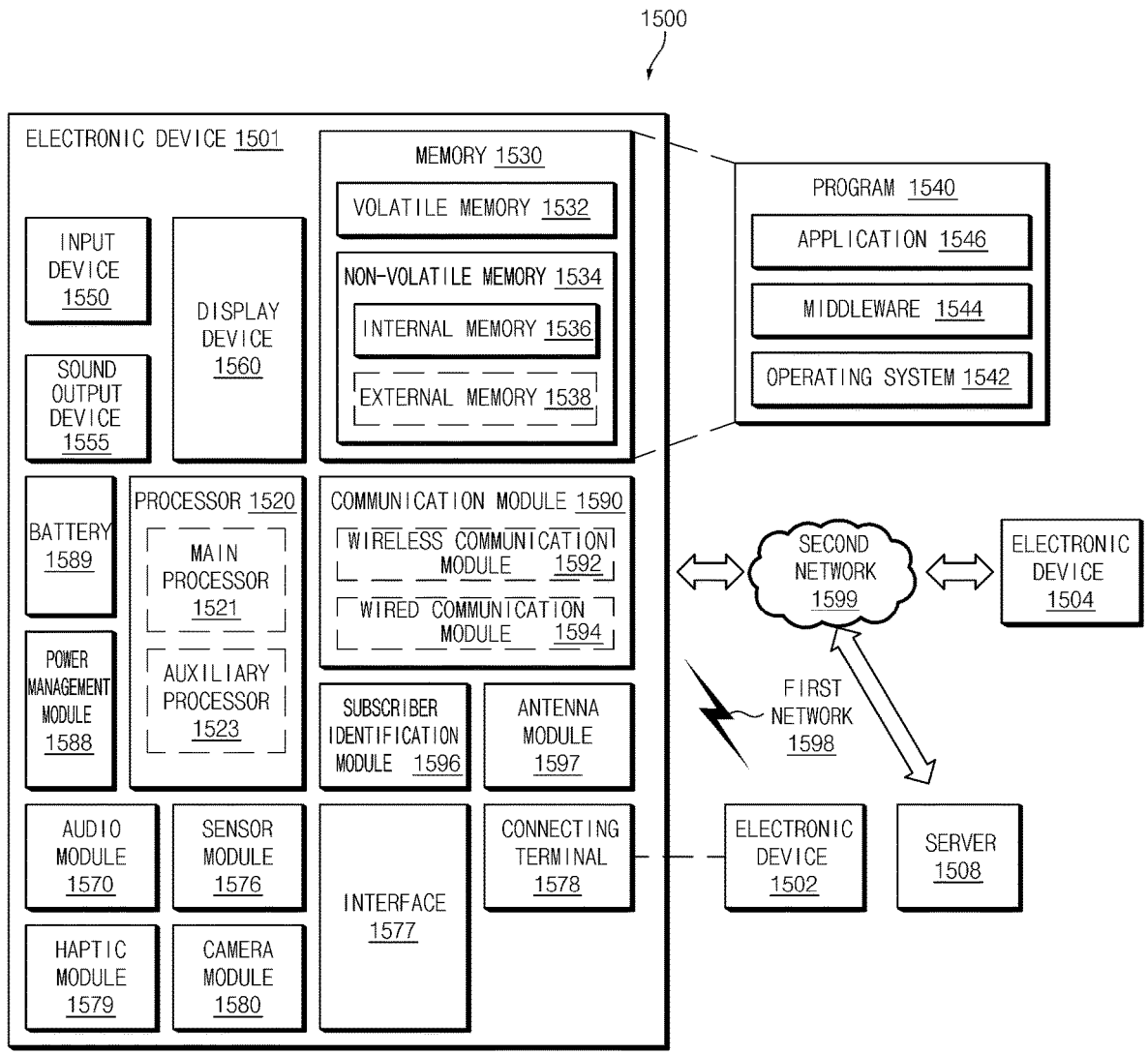
FIG. 15 is a block diagram of an electronic device in a network environment, according to an embodiment of the disclosure.

FIG. 15 is a block diagram illustrating an electronic device 1501 in a network environment 1500 according to an embodiment of the disclosure.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment of the disclosure, the electronic device 1501 may communicate with the electronic device 1504 via the server 1508. According to an embodiment of the disclosure, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments of the disclosure, at least one (e.g., the display device 1560 or the camera module 1580) of the components may be omitted from the electronic device 1501, or one or more other components may be added in the electronic device 1501. In some embodiments of the disclosure, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment of the disclosure, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment of the disclosure, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment of the disclosure, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 1560 may visually provide information to the outside (e.g., a user) of the electronic device 1501.

The display device 1560 may include, for example, a display, a hologram device, or a projector and control circuitry to control a corresponding one of the display, hologram device, and projector. According to an embodiment of the disclosure, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment of the disclosure, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment of the disclosure, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment of the disclosure, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment of the disclosure, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1579 may include, for example, a motor, a piezoelectric element, or an electric stimulator.

The camera module 1580 may capture a still image or moving images. According to an embodiment of the disclosure, the camera module 1580 may include one or more lenses, image sensors, image signal processors, or flashes.

The power management module 1588 may manage power supplied to the electronic device 1501. According to one embodiment of the disclosure, the power management module 1588 may be implemented as at least part of, for example, a power management integrated circuit (PMIC).

The battery 1589 may supply power to at least one component of the electronic device 1501. According to an embodiment of the disclosure, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment of the disclosure, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment of the disclosure, the antenna module 1597 may include an antenna including a radiating element including a conductive material or a conductive pattern formed in or on a substrate (e.g., printed circuit board (PCB)). According to an embodiment of the disclosure, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment of the disclosure, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment of the disclosure, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

Figure 16:
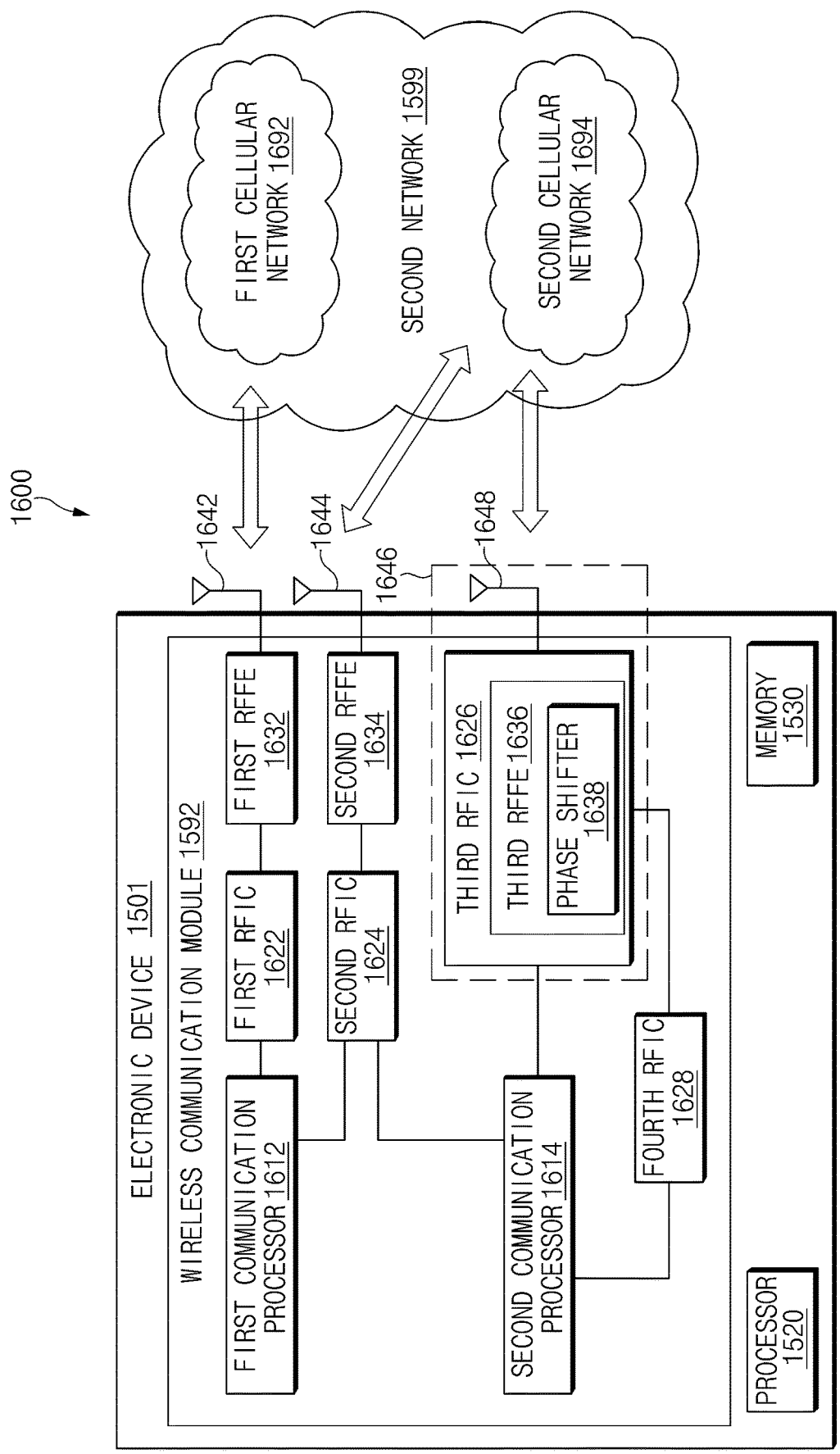
FIG. 16 is a block diagram of an electronic device for supporting legacy network communication and 5G network communication, according to an embodiment of the disclosure.

FIG. 16 is a block diagram 1600 of the electronic device 1501 for supporting legacy network communication and 5G network communication, according to an embodiment of the disclosure.

Referring to FIG. 16, the electronic device 1501 may include a first communication processor 1612, a second communication processor 1614, a first radio frequency integrated circuit (RFIC) 1622, a second RFIC 1624, a third RFIC 1626, a fourth RFIC 1628, a first radio frequency front end (RFFE) 1632, a second RFFE 1634, a first antenna module 1642, a second antenna module 1644, and an antenna 1648. The electronic device 1501 may further include the processor 1520 and the memory 1530. The second network 1599 may include a first cellular network 1692 and a second cellular network 1694. According to another embodiment of the disclosure, the electronic device 1501 may further include at least one component of the components illustrated in FIG. 15, and the second network 1599 may further include at least another network. According to an embodiment of the disclosure, the first communication processor 1612, the second communication processor 1614, the first RFIC 1622, the second RFIC 1624, the fourth RFIC 1628, the first RFFE 1632, and the second RFFE 1634 may form at least a part of the wireless communication module 1592. According to another embodiment of the disclosure, the fourth RFIC 1628 may be omitted or may be included as a part of the third RFIC 1626.

The first communication processor 1612 may establish a communication channel of a band to be used for wireless communication with the first cellular network 1692 and may support legacy network communication over the established communication channel According to various embodiments of the disclosure, the first cellular network 1692 may be a legacy network including a 2nd generation (2G), 3rd generation (3G), 4th generation (4G), and/or long term evolution (LTE) network. The second communication processor 1614 may establish a communication channel corresponding to a specified band (e.g., approximately 6 GHz to approximately 100 GHz) of bands to be used for wireless communication with the second cellular network 1694 and may support the 5G network communication over the established communication channel. According to various embodiments of the disclosure, the second cellular network 1694 may be a 5G network defined in the 3$^{rd}$ generation partnership project (3GPP). Additionally, according to an embodiment of the disclosure, the first communication processor 1612 or the second communication processor 1614 may establish a communication channel for a specified band (e.g., approximately 6 GHz or lower) of the bands to be used for wireless communication with the second cellular network 1694 and may support 5G network communication through the established communication channel According to an embodiment of the disclosure, the first communication processor 1612 and the second communication processor 1614 may be implemented in a single chip or a single package. According to various embodiments of the disclosure, the first communication processor 1612 or the second communication processor 1614 may be implemented in a single chip or a single package together with the processor 1520, the auxiliary processor 1523 of FIG. 15, or the communication module 1590 of FIG. 15.

In the case of transmitting a signal, the first RFIC 1622 may convert a baseband signal generated by the first communication processor 1612 into a radio frequency (RF) signal of approximately 700 megahertz (MHz) to approximately 3 GHz that is used in the first cellular network 1692 (e.g., a legacy network). In the case of receiving a signal, an RF signal may be obtained from the first cellular network 1692 (e.g., a legacy network) through an antenna (e.g., the first antenna module 1642) and may be pre-processed through an RFFE (e.g., the first RFFE 1632). The first RFIC 1622 may convert the pre-processed RF signal into a baseband signal so as to be processed by the first communication processor 1612.

In the case of transmitting a signal, the second RFIC 1624 may convert a baseband signal generated by the first communication processor 1612 or the second communication processor 1614 into an RF signal (hereinafter referred to as a "5G Sub6 RF signal") in a Sub6 band (e.g., approximately 6 GHz or lower) used in the second cellular network 1694 (e.g., a 5G network). In the case of receiving a signal, a 5G Sub6 RF signal may be obtained from the second cellular network 1694 (e.g., a 5G network) through an antenna (e.g., the second antenna module 1644) and may be pre-processed through an RFFE (e.g., the second RFFE 1634). The second RFIC 1624 may convert the pre-processed 5G Sub6 RF signal into a baseband signal so as to be processed by a corresponding communication processor of the first communication processor 1612 or the second communication processor 1614.

The third RFIC 1626 may convert a baseband signal generated by the second communication processor 1614 into an RF signal (hereinafter referred to as a "5G Above6 RF signal") in a 5G Above6 band (e.g., approximately 6 GHz to approximately 60 GHz) to be used in the second cellular network 1694 (e.g., a 5G network). In the case of receiving a signal, a 5G Above6 RF signal may be obtained from the second cellular network 1694 (e.g., a 5G network) through an antenna (e.g., the antenna 1648) and may be pre-processed through a third RFFE 1636. For example, the third RFFE 1636 may perform pre-processing on a signal by using a phase shifter 1638. The third RFIC 1626 may convert the pre-processed 5G Above6 RF signal into a baseband signal so as to be processed by the second communication processor 1614. According to an embodiment of the disclosure, the third RFFE 1636 may be implemented as a part of the third RFIC 1626.

According to an embodiment of the disclosure, the electronic device 1501 may include the fourth RFIC 1628 independently of the third RFIC 1626 or as at least a part of the third RFIC 1626. In this case, the fourth RFIC 1628 may convert a baseband signal generated by the second communication processor 1614 into an RF signal (hereinafter referred to as an "intermediate frequency (IF) signal") in an intermediate frequency band (e.g., approximately 9 GHz to approximately 11 GHz) and may provide the IF signal to the third RFIC 1626. The third RFIC 1626 may convert the IF signal into a 5G Above6 RF signal. In the case of receiving a signal, a 5G Above6 RF signal may be received from the second cellular network 1694 (e.g., a 5G network) through an antenna (e.g., the third antenna 1648) and may be converted into an IF signal by the third RFIC 1626. The fourth RFIC 1628 may convert the IF signal into a baseband signal so as to be processed by the second communication processor 1614.

According to an embodiment of the disclosure, the first RFIC 1622 and the second RFIC 1624 may be implemented as a part of a single package or a single chip. According to an embodiment of the disclosure, the first RFFE 1632 and the second RFFE 1634 may be implemented as a part of a single package or a single chip. According to an embodiment of the disclosure, at least one of the first antenna module 1642 or the second antenna module 1644 may be omitted or may be combined with any other antenna module to process RF signals in a plurality of bands corresponding thereto.

According to an embodiment of the disclosure, the third RFIC 1626 and the antenna 1648 may be disposed at the same substrate to form a third antenna module 1646. For example, the wireless communication module 1592 or the processor 1520 may be disposed on a first substrate (e.g., a main PCB). In this case, the third RFIC 1626 may be disposed in a partial region (e.g., on a lower surface) of a second substrate (e.g., a sub PCB) independent of the first substrate, and the antenna 1648 may be disposed in another partial region (e.g., on an upper surface) of the second substrate. As such, the third antenna module 1646 may be formed. According to an embodiment of the disclosure, the antenna 1648 may include, for example, an antenna array to be used for beamforming. As the third RFIC 1626 and the antenna 1648 are disposed at the same substrate, it may be possible to decrease a length of a transmission line between the third RFIC 1626 and the antenna 1648. For example, the decrease in the transmission line may make it possible to prevent a signal in a high-frequency band (e.g., approximately 6 GHz to approximately 60 GHz) used for 5G network communication from being lost (or attenuated) due to the transmission line. As such, the electronic device 1501 may improve the quality or speed of communication with the second cellular network 1694 (e.g., a 5G network).

The second cellular network 1694 (e.g., a 5G network) may be used independently of the first cellular network 1692 (e.g., a legacy network) (e.g., this scheme being called "stand-alone (SA)") or may be used in connection with the first cellular network 1692 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 1501 may access the access network of the 5G network and may then access an external network (e.g., an Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 1530 so as to be accessed by any other component (e.g., the processor 1520, the first communication processor 1612, or the second communication processor 1614).

Figure 17:
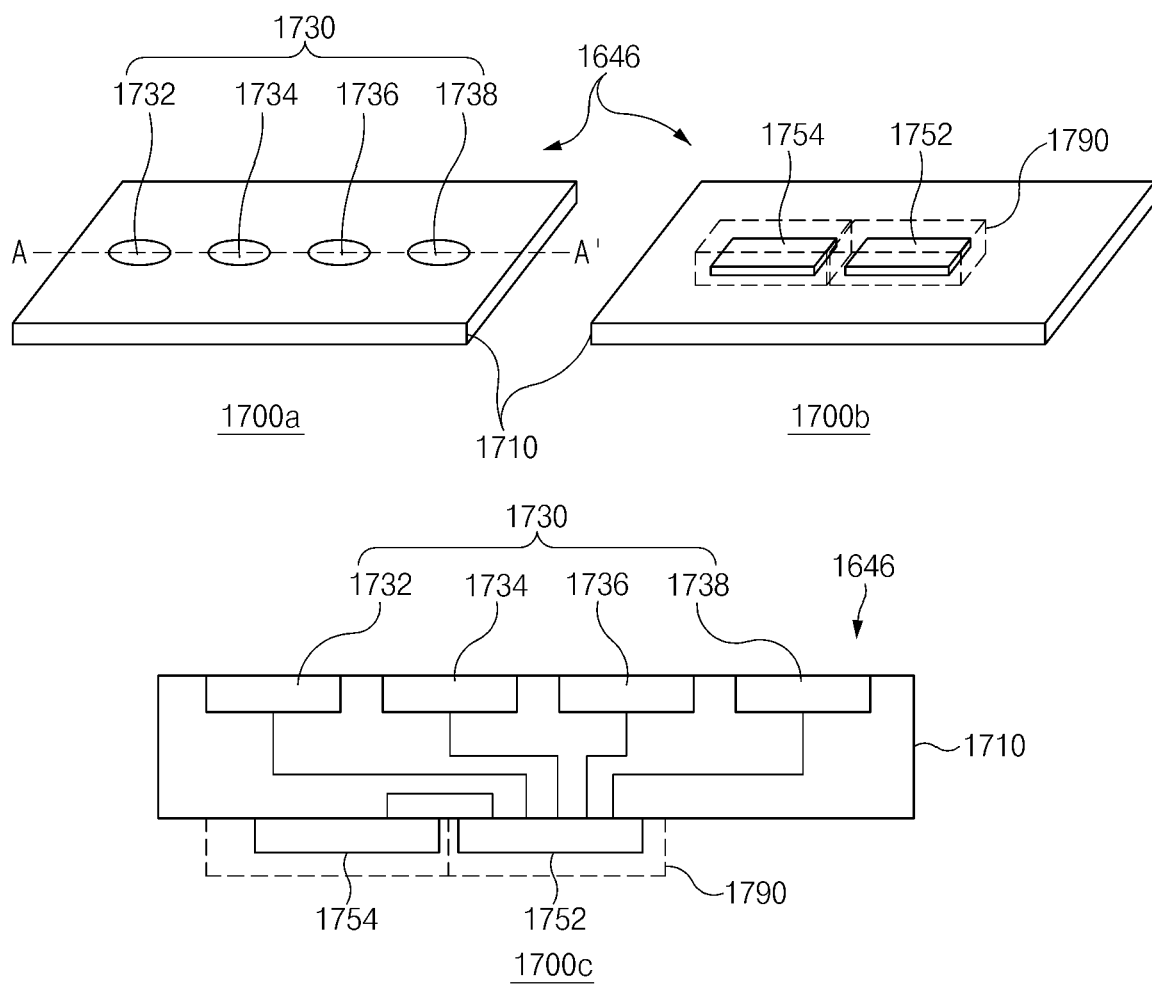
FIG. 17 illustrates an embodiment of a third antenna module described with reference to FIG. 16, according to an embodiment of the disclosure.

FIG. 17 illustrates an embodiment of the third antenna module 1646 described with reference to FIG. 16 according to an embodiment of the disclosure.

1700*a* of FIG. 17 is a perspective view of the third antenna module 1646 when viewed from one side, and 1700*b* of FIG. 17 is a perspective view of the third antenna module 1646 when viewed from another side. 1700*c* of FIG. 17 is a cross-sectional view of the third antenna module 1646 taken along line A-A'.

Referring to FIG. 17, in an embodiment of the disclosure, the third antenna module 1646 may include a printed circuit board 1710, an antenna array 1730, a radio frequency integrated circuit (RFIC) 1752, a power management integrated circuit (PMIC) 1754, and a module interface (not illustrated). Selectively, the third antenna module 1646 may further include a shielding member 1790. In various embodiments of the disclosure, at least one of the above components may be omitted, or at least two of the components may be integrally formed. In an embodiment of the disclosure, an antenna structure (e.g., the antenna structure 300 of FIG. 5) may include the printed circuit board 1710 or the antenna array 1730.

The printed circuit board 1710 may include a plurality of conductive layers and a plurality of non-conductive layers, and the conductive layers and the non-conductive layers may be alternately stacked. The printed circuit board 1710 may provide an electrical connection between the printed circuit board 1710 and/or various electronic components disposed on the outside by using wires and conductive vias formed in the conductive layers.

The antenna array 1730 (e.g., 1648 of FIG. 16) may include a plurality of antenna elements 1732, 1734, 1736, and 1738 disposed to form a directional beam. The antenna elements 1732, 1734, 1736, and 1738 may be formed on a first surface of the printed circuit board 1710 as illustrated. According to various embodiments of the disclosure, the antenna array 1730 may be formed within the printed circuit board 1710. According to embodiments of the disclosure, the antenna array 1730 may include a plurality of antenna arrays (e.g., a dipole antenna array and/or a patch antenna array), of which shapes or kinds are identical or different.

The RFIC 1752 (e.g., the third RFIC 1626 of FIG. 16) may be disposed in another region (e.g., on a second surface facing away from the first surface) of the printed circuit board 1710, which is spaced apart from the antenna array 1730. The RFIC 1752 may be configured to process a signal in the selected frequency band, which is transmitted/received through the antenna array 1730. According to an embodiment of the disclosure, in the case of transmitting a signal, the RFIC 1752 may convert a baseband signal obtained from a communication processor (not illustrated) into an RF signal in a specified band. In the case of receiving a signal, the RFIC 1752 may convert an RF signal received through the antenna array 1730 into a baseband signal and may provide the baseband signal to the communication processor.

According to another embodiment of the disclosure, in the case of transmitting a signal, the RFIC 1752 may up-convert an IF signal (e.g., approximately 9 GHz to approximately 11 GHz) obtained from an intermediate frequency integrated circuit (IFIC) (e.g., the fourth RFIC 1628 of FIG. 16) into an RF signal. In the case of receiving a signal, the RFIC 1752 may down-convert an RF signal obtained through the antenna array 1730 into an IF signal and may provide the IF signal to the IFIC.

The PMIC 1754 may be disposed in another region (e.g., on the second surface) of the printed circuit board 1710, which is spaced from the antenna array 1730. The PMIC 1754 may be supplied with a voltage from a main PCB (not illustrated) and may provide a power necessary for various components (e.g., the RFIC 1752) on an antenna module.

The shielding member 1790 may be disposed at a portion (e.g., on the second surface) of the printed circuit board 1710 such that at least one of the RFIC 1752 or the PMIC 1754 is electromagnetically shielded. According to an embodiment of the disclosure, the shielding member 1790 may include a shield can.

Although not illustrated in drawings, in various embodiments of the disclosure, the third antenna module 1646 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 1752 and/or the PMIC 1754 of the third antenna module 1646 may be electrically connected with the printed circuit board 1710 through the connection member.

Figure 18:
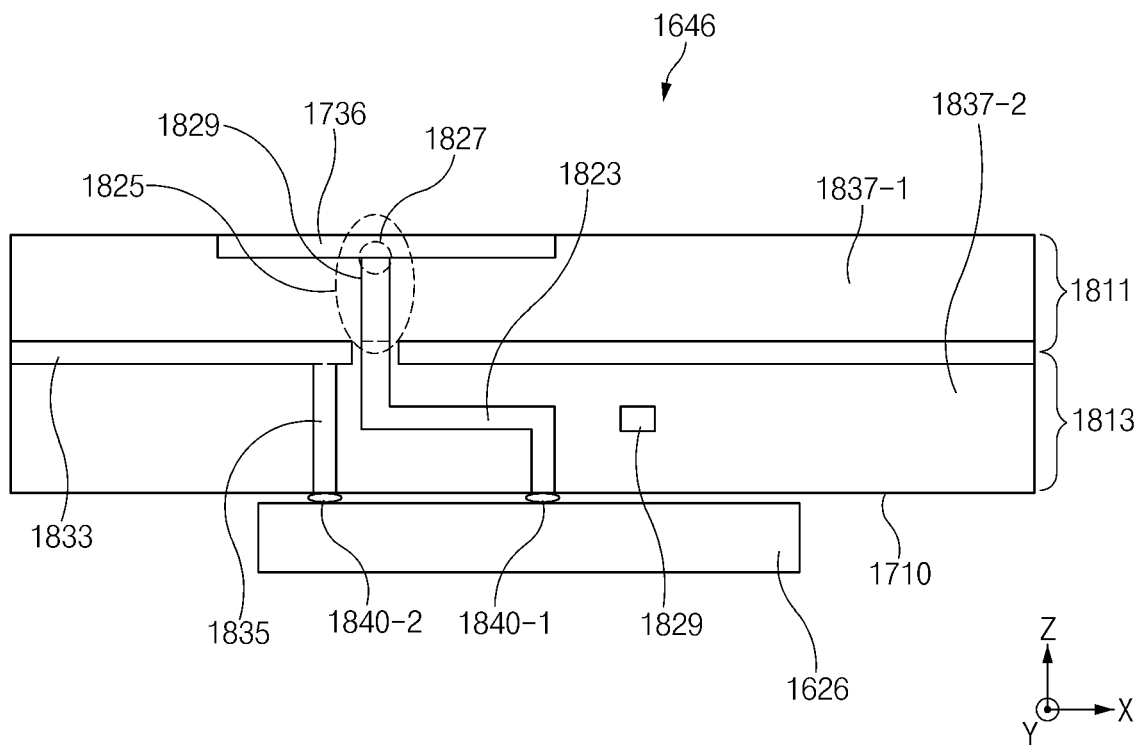
FIG. 18 illustrates a cross-sectional view of a third antenna module taken along line A-A' of 1700a of FIG. 17 according to an embodiment of the disclosure.

FIG. 18 illustrates a cross-sectional view of the third antenna module 1646 taken along line A-A' of 1700a of FIG. 17 according to an embodiment of the disclosure.

Referring to FIG. 18, the printed circuit board 1710 of the embodiment illustrated may include an antenna layer 1811 and a network layer 1813.

The antenna layer 1811 may include at least one dielectric layer 1837-1, and the antenna element 1736 and/or a feeding part 1825 formed on an outer surface of the dielectric layer 1737-1 or therein. The feeding part 1825 may include a feeding point 1827 and/or a feeding line 1829.

The network layer 1813 may include at least one dielectric layer 1837-2, and at least one ground layer 1833, at least one conductive via 1835, a transmission line 1823, and/or a feeding line 1829 formed on an outer surface of the dielectric layer 1837-2 or therein.

In addition, in the embodiment illustrated, the third RFIC 1626 may be electrically connected with the network layer 1813, for example, through first and second connection parts (e.g., solder bumps) 1840-1 and 1840-2. In other embodiments of the disclosure, various connection structures (e.g., soldering or a ball grid array (BGA)) may be utilized instead of the connection parts 1840-1 and 1840-2. The third RFIC 1626 may be electrically connected with the antenna element 1736 through the first connection part 1840-1, the transmission line 1823, and the feeding part 1825. In addition, the third RFIC 1626 may be electrically connected with the ground layer 1833 through the second connection part 1840-2 and the conductive via 1835. Although not illustrated in drawings, the third RFIC 1626 may also be electrically connected with the above module interface through the feeding line 1829.

According to embodiments of the disclosure, an electronic device 200 may include a housing structure 210 (e.g., including the front plate 220 and the back plate 280) that includes a ceramic portion 211 or 281 including a ceramic material, and a polymer portion 212 or 282 formed on an inner surface of the ceramic portion 211 or 281 and including a polymer material, and an antenna structure 300 that is disposed within the housing structure 210 and radiates a radio frequency (RF) signal to an outside of the housing structure 210. The housing structure (e.g., the back plate 280) may include a first portion 213 or 283 including at least a portion of a region through which the RF signal passes, and a second portion formed around the first portion 213 or 283. In the first portion 213 or 283, a ratio of a thickness of the polymer portion 212 or 282 to an entire thickness of the first portion 213 or 283 may be a first ratio. In the second portion, a ratio of a thickness of the polymer portion 212 or 282 to an entire thickness of the second portion may be a second ratio.

In various embodiments of the disclosure, the electronic device 200 may further include a display 230 that is disposed within the housing structure 210 (e.g., including the front plate 220 and the back plate 280) so as to be visually exposed through a first surface (e.g., a front surface) of the housing structure 210. The antenna structure 300 may be disposed such that the RF signal is radiated through a second surface (e.g., a back surface) of the housing 210, and the second surface may include the first portion 213 or 283.

In various embodiments of the disclosure, the housing structure 210 (e.g., including the back plate 280) may be formed such that the first ratio and the second ratio are substantially equal.

In various embodiments of the disclosure, the housing structure 210 (e.g., including the back plate 280) may be formed such that the first ratio is greater than the second ratio.

In various embodiments of the disclosure, the housing structure 210 (e.g., including the back plate 280) may be formed such that the first ratio is greater than "0" and the second ratio is "0".

In various embodiments of the disclosure, the housing structure 210 (e.g., including the back plate 280) may be formed such that the first ratio is "0" and the second ratio is greater than "0".

In various embodiments of the disclosure, the housing structure 210 (e.g., including the back plate 280) may be formed such that the first ratio is greater than 0.5.

In various embodiments of the disclosure, the housing structure 210 (e.g., including the back plate 280) may be formed such that a thickness of the polymer portion is 0.1 mm or more and 0.5 mm or less.

In various embodiments of the disclosure, the housing structure 210 (e.g., including the back plate 280) may be formed such that a thickness of the ceramic portion is 0.4 mm or less.

In various embodiments of the disclosure, the antenna structure 300 may be disposed to be spaced apart from the first portion 213 or 283 as much as a given interval, and the given interval may be is 0.4 mm or more.

In various embodiments of the disclosure, the electronic device 200 may further include a display 230 that is disposed within the housing structure 210. The housing structure 210 may include a front plate 220 through which the display 230 is visually exposed, a back plate 280 facing away from the front plate 220, and a bracket 240 including a frame structure 241 surrounding a space between the front plate 220 and the back plate 280, and the first portion 213 or 283 may be included in the back plate 280.

According to embodiments of the disclosure, an electronic device 200 may include a housing structure 210 that includes a front plate 220, a back plate 280 facing away from the front plate 220, and a bracket 240 including a frame structure 241 surrounding a space between the front plate 220 and the back plate 280 and a plate structure 242 extended from the frame structure 241 to an inner space between the front plate 220 and the back plate 280, the back plate 280 including a ceramic portion 211 or 281 and a polymer portion 212 or 282, a display 230 that is interposed between the front plate 220 and the plate structure 242 and is viewable through the front plate 220, and an antenna structure 300 that is interposed between the back plate 280 and the plate structure 242 and forms a beam. The back plate 280 may include a first portion 213 or 283 facing the antenna structure 300, and the ceramic portion 211 or 281 may be formed to have a first thickness at the first portion 213 or 283 and may be formed to have a second thickness greater than the first thickness at a remaining portion of the back plate 280.

In various embodiments of the disclosure, the polymer portion 212 or 282 may be formed on an inner surface of the ceramic portion, the antenna structure 300 may be disposed to be spaced apart from the polymer portion 212 or 282 included in the first portion 213 or 283 as much as a given interval, and the given interval is 0.4 mm or more and 10 mm or less.

In various embodiments of the disclosure, first thickness may be 0.1 mm or more and 0.4 mm or less.

In various embodiments of the disclosure, a thickness of the polymer portion 212 or 282 included in the first portion 213 or 283 may be 0.1 mm or more and 0.5 mm or less.

In various embodiments of the disclosure, the antenna structure 300 may include a conductive pattern 312, the conductive pattern 312 may be disposed on a surface of the antenna structure 300 or is disposed within the antenna structure 300, and, when viewed from above the back plate 280, at least a portion of the polymer portion 212 or 282 may overlap the antenna structure 300.

In various embodiments of the disclosure, the ceramic portion 211 or 281 of the back plate 280 may include a concave-convex structure including a plurality of protrusions 413 protruding toward the inner space, and the polymer portion 212 or 282 may be formed by filling a polymer material between the plurality of protrusions.

In various embodiments of the disclosure, the antenna structure 300 may transmit and receive an RF signal in a frequency band having a given bandwidth within a range from 24 GHz or higher to 32 GHz or lower. In the first portion 213 or 283, a thickness of the ceramic portion 211 or 281 may be 0.1 mm or more and 0.4 mm or less, and a thickness of the polymer portion 212 or 282 may be 0.1 mm or more and 0.5 mm or less.

In various embodiments of the disclosure, the antenna structure 300 may transmit and receive an RF signal in a frequency band having a given bandwidth within a range from 35 GHz or higher to 60 GHz or lower. In the first portion 213 or 283, a thickness of the ceramic portion 211 or 281 may be 0.1 mm or more and 0.3 mm or less, and a thickness of the polymer portion 212 or 282 may be 0.1 mm or more and 0.5 mm or less.

In various embodiments of the disclosure, the antenna structure 300 may transmit and receive an RF signal in a frequency band having a given bandwidth within a range from 50 GHz or higher to 100 GHz or lower. In the first portion 213 or 283, a thickness of the ceramic portion 211 or 281 may be 0.1 mm or more and 0.2 mm or less, and a thickness of the polymer portion 212 or 282 may be 0.1 mm or more and 0.5 mm or less.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to embodiments of the disclosure, a housing including a nonmetal portion of a thickness capable of securing a wireless communication performance in a specified frequency band (e.g., a 5G frequency band) may be provided. In addition, the housing may include a polymer portion formed at the nonmetal portion, the thickness of which is small, through injection-molding, and thus, a rigidity of the nonmetal portion relatively weak from an impact may be reinforced.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a ceramic portion including a ceramic material, and a polymer portion formed on an inner surface of the ceramic portion and including a polymer material, the housing includes a first portion and a second portion around the first portion; and
an antenna structure disposed within the housing and configured to radiate a radio frequency (RF) signal passing through the first portion of the housing,
wherein the ceramic portion of the first portion is thinner than the ceramic portion of the second portion, and
wherein the antenna structure is disposed so as to be spaced apart from the polymer portion of the first portion.

2. The electronic device of claim 1,
wherein the first portion includes at least a portion of a region through which the RF signal passes,
wherein, in the first portion, a ratio of a thickness of the polymer portion to an entire thickness of the first portion is a first ratio, and
wherein, in the second portion, a ratio of a thickness of the polymer portion to an entire thickness of the second portion is a second ratio.

3. The electronic device of claim 2, wherein the housing is formed such that the first ratio and the second ratio are substantially equal.

4. The electronic device of claim 2, wherein the housing is formed such that the first ratio is greater than the second ratio.

5. The electronic device of claim 2, wherein the housing is formed such that the first ratio is greater than "0" and the second ratio is "0".

6. The electronic device of claim 2, wherein the housing is formed such that the first ratio is "0" and the second ratio is greater than "0".

7. The electronic device of claim 2, wherein the housing is formed such that the first ratio is greater than 0.5.

8. The electronic device of claim 1, further comprising:
a display disposed within the housing so as to be visually exposed through a first surface of the housing,
wherein the antenna structure is disposed such that the RF signal is radiated through a second surface of the housing, and
wherein the second surface includes the first portion.

9. The electronic device of claim 1, wherein the housing is formed such that a thickness of the polymer portion is 0.1 mm or more and 0.5 mm or less.

10. The electronic device of claim 1, wherein the housing is formed such that a thickness of the ceramic portion is 0.1 mm or more and 0.4 mm or less.

11. The electronic device of claim 1,
wherein the antenna structure is disposed to be spaced apart from the first portion as much as a given interval, and
wherein the given interval is 0.4 mm or more and 10 mm or less.

12. The electronic device of claim 1, further comprising:
a display disposed within the housing,
wherein the housing includes:
a front plate through which the display is visually exposed,
a back plate facing away from the front plate, and
a bracket including a frame structure surrounding a space between the front plate and the back plate, and
wherein the first portion is included in the back plate.

13. The electronic device of claim 12, wherein, when viewed from above the back plate, at least a portion of the polymer portion overlaps the antenna structure.

14. The electronic device of claim 1,
wherein the antenna structure includes a conductive pattern, and
wherein the conductive pattern is disposed on a surface of the antenna structure or is disposed within the antenna structure.

* * * * *